US011892298B2

(12) United States Patent
Rivers et al.

(10) Patent No.: US 11,892,298 B2
(45) Date of Patent: Feb. 6, 2024

(54) NAVIGATIONAL DANGER IDENTIFICATION AND FEEDBACK SYSTEMS AND METHODS

(71) Applicant: FLIR Belgium BVBA, Meer (BE)

(72) Inventors: Mark Rivers, Winchester (GB); Mark Johnson, Vannes (FR); Cenk Tugcetin, Thatcham (GB); Christopher Gatland, Fareham (GB)

(73) Assignee: FLIR Belgium BVBA ( * ) Notice: Subject to any disclaimer, the term of this patent is extended or adjusted under 35 U.S.C. 154(b) by 14 days.

(21) Appl. No.: 17/642,531

(22) PCT Filed: Sep. 17, 2020

(86) PCT No.: PCT/US2020/051334
§ 371 (c)(1),
(2) Date: Mar. 11, 2022

(87) PCT Pub. No.: WO2021/055646
PCT Pub. Date: Mar. 25, 2021

(65) Prior Publication Data
US 2022/0326018 A1 Oct. 13, 2022

Related U.S. Application Data

(60) Provisional application No. 62/901,543, filed on Sep. 17, 2019.

(51) Int. Cl.
G01C 21/20 (2006.01)
G01S 19/13 (2010.01)
G08G 3/02 (2006.01)
B63B 49/00 (2006.01)

(52) U.S. Cl.
CPC ............ *G01C 21/203* (2013.01); *G01S 19/13* (2013.01); *G08G 3/02* (2013.01); *B63B 49/00* (2013.01)

(58) Field of Classification Search
CPC ..... G01C 21/203; G01C 21/005; G01C 21/3647; G01C 21/3697; G01S 19/13; G01S 13/89; G01S 7/20; G01S 13/86; G01S 17/93; G01S 13/937; G01S 15/93; G08G 3/02; B63B 49/00
See application file for complete search history.

(56) References Cited

FOREIGN PATENT DOCUMENTS

WO   WO 2016/065088         4/2016
WO   WO 20160/65088 A2 *    4/2016
WO   WO 2017/136014 A9 *    8/2017

* cited by examiner

Primary Examiner — Brian P Sweeney
(74) Attorney, Agent, or Firm — Haynes and Boone, LLP

(57) ABSTRACT

Techniques are disclosed for systems and methods for navigational danger identification and feedback. A navigation system may include one or more navigation sensors coupled to and/or associated with a mobile structure and a logic device. The one or more navigation sensors are configured to provide navigational data associated with the mobile structure. The logic device is configured to receive navigational data from the one or more navigation sensors; determine a virtual model comprising at least one navigational hazard based, at least in part, on the received navigational data; and generate a navigation display view comprising a virtual model view based, at least in part, on the determined virtual model, wherein the virtual model view comprises at least one navigation threat indicator corresponding to the at least one navigational hazard.

20 Claims, 10 Drawing Sheets

NAVIGATIONAL DANGER IDENTIFICATION AND FEEDBACK SYSTEMS AND METHODS

CROSS-REFERENCE TO RELATED APPLICATIONS

This patent application is a U.S. National Stage Patent Application under 35 U.S.C. 371 of International Patent Application No. PCT/2020/051334 filed Sep. 17, 2020 and entitled "NAVIGATIONAL DANGER IDENTIFICATION AND FEEDBACK SYSTEMS AND METHODS," which claims priority to and benefit of U.S. Provisional Patent Application No. 62/901,543 filed Sep. 17, 2019 and entitled "NAVIGATIONAL DANGER IDENTIFICATION AND FEEDBACK SYSTEMS AND METHODS," which are hereby incorporated by reference in their entirety.

TECHNICAL FIELD

One or more embodiments of the invention relate generally to navigation systems and more particularly, for example, to systems and methods for navigational danger/hazard identification and feedback.

BACKGROUND

Navigation of watercraft and other mobile structures often involves navigating the mobile structure within an area including a variety of navigational hazards. Conventional navigation systems often include multiple different types of navigation sensors, such as radar and/or sonar systems, for example, where different types of navigational hazards are each detected by a single associated type of navigation sensor, each with its own particular set of detection and reporting/alarm characteristics, and often each with its own dedicated display view. Particularly while navigating through an area with multiple and different types of navigational hazards, it can be difficult to determine which navigational hazard presents the most immediate threat, and to do so quickly and reliably, in the context of both manual piloting and autopiloting the mobile structure through a particular area, such as according to a desired or planned route/waypoint objective. Thus, there is a need in the art for systems and methods to identify and/or present multiple different types of navigational hazards to a pilot of a vessel in a simplified and intuitive manner.

SUMMARY

Techniques are disclosed for systems and methods for navigational danger/hazard identification and feedback. In one embodiment, a navigation system may include one or more navigation sensors coupled to and/or associated with a mobile structure and a logic device. The one or more navigation sensors may be configured to provide navigational data associated with the mobile structure. The logic device may be configured to receive navigational data from the one or more navigation sensors; determine a virtual model comprising at least one navigational hazard based, at least in part, on the received navigational data; and generate a navigation display view comprising a virtual model view based, at least in part, on the determined virtual model, wherein the virtual model view comprises at least one navigation threat indicator corresponding to the at least one navigational hazard. The logic device may also be configured to provide feedback to a user regarding the one or more navigational dangers, which may include rendering the one or more navigational dangers on a display of a user interface, for example, and/or generating a plurality of safety alarms based on the one or more navigational dangers, the plurality of safety alarms grouped into a plurality of alarm presets, each alarm preset including a different alarm subset of the plurality of safety alarms, each alarm subset corresponding to a different scenario of the mobile structure. At least one alarm preset may be activated or deactivated based on user input and/or positional data of the mobile structure to activate or deactivate a group of safety alarms at the same time based on user selection and/or a position of the mobile structure.

In another embodiment, a method includes receiving navigational data from one or more navigation sensors coupled and/or in proximity to a mobile structure and configured to provide navigational data associated with the mobile structure; determining a virtual model comprising at least one navigational hazard based, at least in part, on the received navigational data; and generating a navigation display view comprising a virtual model view based, at least in part, on the determined virtual model, wherein the virtual model view comprises at least one navigation threat indicator corresponding to the at least one navigational hazard. The method may also include providing feedback to a user regarding the one or more navigational dangers, which may include rendering the one or more navigational dangers on a display of a user interface, for example, and/or generating a plurality of safety alarms based on the one or more navigational dangers, the plurality of safety alarms grouped into a plurality of alarm presets, each alarm preset including a different alarm subset of the plurality of safety alarms, each alarm subset corresponding to a different scenario of the mobile structure. At least one alarm preset may be activated or deactivated based on user input and/or positional data of the mobile structure to activate or deactivate a group of safety alarms at the same time based on user selection and/or a position of the mobile structure.

The scope of the invention is defined by the claims, which are incorporated into this section by reference. A more complete understanding of embodiments of the invention will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE DRAWINGS

Embodiments of the invention and their advantages are best understood by referring to the detailed description that follows. It should be appreciated that like reference numerals are used to identify like elements illustrated in one or more of the figures.

DETAILED DESCRIPTION

Figure 1A:
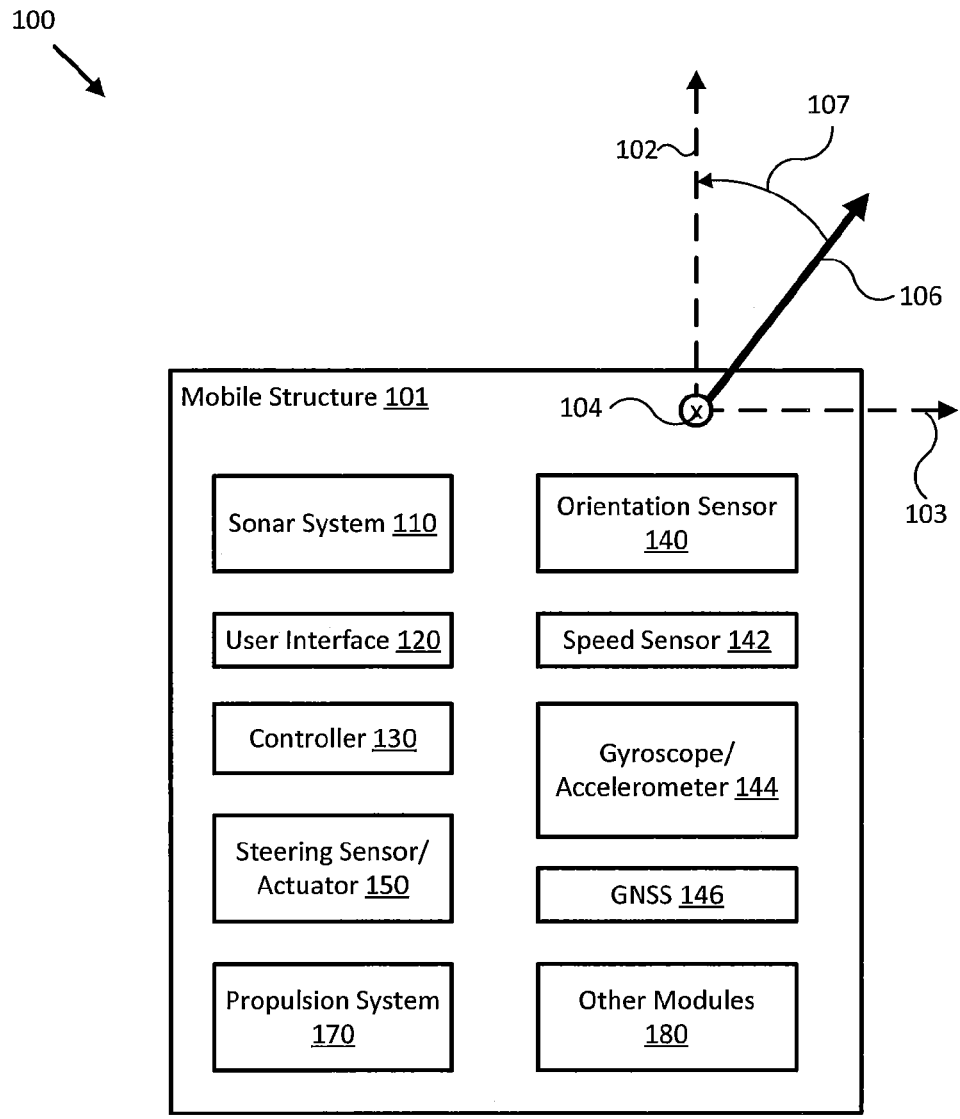
FIG. 1A illustrates a block diagram of a navigation system in accordance with an embodiment of the disclosure.

In accordance with various embodiments of the present disclosure, navigation systems may be provided to generate navigation display views including a prospective threat timeline identifying any navigational hazards threatening a mobile structure as it navigates according to a planned route or selected course. For example, a navigation system may be configured to assist in navigating a mobile structure in an area including multiple and different types of navigational hazards. Embodiments described herein are configured to generate a virtual model of the navigable area about the mobile structure (e.g., an integrated model, as described herein) and render a view of the virtual model including graphical representations of at least the present-time navigational hazards about the mobile structure, as detected by various navigation sensors integrated with the navigation system, and including various navigation threat indicators configured to indicate relative positions and/or extents of corresponding navigational exclusion zones that intersect a planned route or selected course of the mobile structure. Embodiments may be configured to use such virtual model to determine prospective relative positions and/or extents of such navigational exclusion zones and to generate a navigation display view including a prospective view of the virtual model that indicates the prospective relative positions and/or extents of such navigational exclusion zones at a selected future time. Embodiments may also be configured to use such virtual model to generate simplified proximity alarms in a manner designed to limit distraction of a pilot of the mobile structure.

More generally, navigation systems may be provided by various portable and/or fixed navigation sensors associated with a mobile structure. The navigation sensors may include imaging modules, sonar systems including one or more sonar transducer assemblies, radar systems, other ranging sensor systems, global navigation satellite systems (GNSSs), and/or other position sensors, orientation sensors, gyroscopes, accelerometers, and/or speed sensors providing measurements of an orientation, a position, an acceleration, and/or a speed of corresponding navigation sensor assemblies and/or a coupled mobile structure. For example, various navigation sensors may be mounted to or within the mobile structure (e.g., a watercraft, aircraft, motor vehicle, and/or other mobile structure), may be integrated with other sensor assemblies, or may be integrated within a portable device. Examples of portable devices include portable GNSS receivers, smartphones, tablets, portable computers, portable sensor suites, cameras, and/or other portable devices integrated with sensors, a user interface, and/or communication modules, as described herein.

Embodiments of the present disclosure provide navigational danger calculation, visualization, and feedback control, thereby allowing a user to: 1) visualize multiple targets/navigational dangers in one or more views of the navigational situation around a mobile structure, 2) assess the threat level of each target/navigational danger, 3) automatically identify one or more targets/navigational dangers presenting the greatest or most immediate threat, 4) group navigational safety alarms into presets, 5) activate/deactivate multiple navigational safety alarms with minimal user input or automatically, and/or 6) value set multiple navigational safety alarms with minimal user input or automatically.

FIG. 1A illustrates a block diagram of a navigation system in accordance with an embodiment of the disclosure. In various embodiments, system 100 may be adapted to measure an orientation, a position, an acceleration, and/or a speed of mobile structure 101, and/or other elements of system 100. System 100 may include a plurality of navigation sensors that may each produce navigational sensor data. For example, as shown in FIG. 1A, such navigation sensors may include a sonar system 110, a steering sensor/actuator 150, an orientation sensor 140, a speed sensor 142, a gyroscope/accelerometer 144, a GNSS 146, and/or other modules 180 (i.e., a radar system, one or more imaging modules, other ranging sensors, various environmental sensors, sensors directed towards the dynamic characteristics of the mobile structure, and/or other navigation sensors, as described herein). In certain embodiments, a plurality of certain types of the same sensor may be included within system 100.

More generally, system 100 may be configured to provide sensor data and/or imagery for a particular type of mobile structure 101, such as a drone, a watercraft, an aircraft, a robot, a vehicle, and/or other types of mobile structures, and system 100 may include one or more of sonar system 110, user interface 120, controller 130, orientation sensor 140, speed sensor 142, gyroscope/accelerometer 144, GNSS 146, steering sensor/actuator 150, propulsion system 170, and one or more other sensors and/or actuators (other modules 180). In some embodiments, one or more of the elements of system 100 may be implemented in a combined housing or structure that can be coupled to mobile structure 101 and/or held or carried by a user of mobile structure 101.

In various embodiments, system 100 may be configured to use navigation sensor measurements to form various views of sensor data provided by the various navigation sensors within system 100 and/or to adjust an orientation of one, some, or all of the elements of system 100 according to a desired operation of the elements of system 100 and/or mobile structure 101. In some embodiments, system 100 may display resulting sensor data and/or imagery to a user through user interface 120, and/or use the sensor data and/or imagery to control operation of mobile structure 101, such as controlling steering actuator 150 and/or propulsion system 170 to steer mobile structure 101 according to a desired heading, such as heading angle 107, for example.

Directions 102, 103, and 104 describe one possible coordinate frame of mobile structure 101 (e.g., for headings or orientations measured by orientation sensor 140 and/or angular velocities and accelerations measured by gyroscope/ accelerometer 144). As shown in FIG. 1A, direction 102 illustrates a direction that may be substantially parallel to and/or aligned with a longitudinal axis of mobile structure 101, direction 103 illustrates a direction that may be substantially parallel to and/or aligned with a lateral axis of mobile structure 101, and direction 104 illustrates a direction that may be substantially parallel to and/or aligned with a vertical axis of mobile structure 101, as described herein. For example, a roll component of motion of mobile structure 101 may correspond to rotations around direction 102, a pitch component may correspond to rotations around direction 103, and a yaw component may correspond to rotations around direction 104.

Heading angle 107 may correspond to the angle between a projection of a reference direction 106 (e.g., the local component of the Earth's magnetic field) onto a horizontal plane (e.g., referenced to a gravitationally defined "down" vector local to mobile structure 101) and a projection of direction 102 onto the same horizontal plane. In some embodiments, the projection of reference direction 106 onto a horizontal plane (e.g., referenced to a gravitationally defined "down" vector) may be referred to as Magnetic North. In various embodiments, Magnetic North, a "down" vector, and/or various other directions, positions, and/or fixed or relative reference frames may define an absolute coordinate frame, for example, where directional measurements referenced to an absolute coordinate frame may be referred to as absolute directional measurements (e.g., an "absolute" orientation). In some embodiments, directional measurements may initially be referenced to a coordinate frame of a particular sensor (e.g., a sonar transducer assembly or other module of sonar system 110, and/or user interface 120) and be transformed (e.g., using parameters for one or more coordinate frame transformations) to be referenced to an absolute coordinate frame and/or a coordinate frame of mobile structure 101. In various embodiments, an absolute coordinate frame may be defined and/or correspond to a coordinate frame with one or more undefined axes, such as a horizontal plane local to mobile structure 101 and referenced to a local gravitational vector but with an unreferenced and/or undefined yaw reference (e.g., no reference to Magnetic North).

Sonar system 110 may be implemented as one or more electrically and/or mechanically coupled controllers, transmitters, receivers, transceivers, signal processing logic devices, various electrical components, transducer elements of various shapes and sizes, multichannel transducers/transducer modules, transducer assemblies, assembly brackets, transom brackets, and/or various actuators adapted to adjust orientations of any of the components of sonar system 110, as described herein.

For example, in various embodiments, sonar system 110 may be implemented and/or operated according to any of the systems and methods described in U.S. Provisional Patent Application 62/005,838 filed May 30, 2014 and entitled "MULTICHANNEL SONAR SYSTEMS AND METHODS", and/or U.S. Provisional Patent Application 61/943,170 filed Feb. 21, 2014 and entitled "MODULAR SONAR TRANSDUCER ASSEMBLY SYSTEMS AND METHODS", both of which are hereby incorporated by reference in their entirety. In other embodiments, sonar system 110 may be implemented according to other sonar system arrangements that can be used to detect objects within a water column and/or a floor of a body of water.

More generally, sonar system 110 may be configured to emit one, multiple, or a series of acoustic beams, receive corresponding acoustic returns, and convert the acoustic returns into sonar data and/or imagery, such as bathymetric data, water depth, water temperature, water column/volume debris, bottom profile, and/or other types of sonar data. Sonar system 110 may be configured to provide such data and/or imagery to user interface 120 for display to a user, for example, or to controller 130 for additional processing, as described herein.

In some embodiments, sonar system 110 may be implemented using a compact design, where multiple sonar transducers, sensors, and/or associated processing devices are located within a single transducer assembly housing that is configured to interface with the rest of system 100 through a single cable providing both power and communications to and from sonar system 110. In some embodiments, sonar system 110 may include orientation and/or position sensors configured to help provide two or three-dimensional waypoints, increase sonar data and/or imagery quality, and/or provide highly accurate bathymetry data, as described herein.

For example, fisherman desire highly detailed and accurate information and/or imagery of underwater structure and mid water targets (e.g., fish). Conventional sonar systems can be expensive and bulky and typically cannot be used to provide enhanced and/or augmented reality underwater views, as described herein. Embodiments of sonar system 110 include low cost single, dual, and/or multichannel sonar systems that can be configured to produce detailed two and three-dimensional sonar data and/or imagery. In some embodiments, sonar system 110 may consolidate electronics and transducers into a single waterproof package to reduce size and costs, for example, and may be implemented with a single connection to other devices of system 100 (e.g., via an Ethernet cable with power over Ethernet, an integral power cable, and/or other communication and/or power transmission conduits integrated into a single interface cable).

In various embodiments, sonar system 110 may be configured to provide many different display views from a variety of selectable perspectives, including down imaging, side imaging, and/or three-dimensional imaging, using a selection of configurations and/or processing methods, as described herein. In some embodiments, sonar system 110 may be implemented with a single transducer assembly housing incorporating one or two transducers and/or associated electronics. In other embodiments, sonar system 110 may be implemented with a transducer assembly housing/incorporating a multichannel transducer and/or associated electronics. In such embodiments, sonar system 110 may be configured to transmit acoustic beams using a transmission channel and/or element of a multichannel transducer, receive acoustic returns using multiple receive channels and/or elements of the multichannel transducer, and to perform beamforming and/or interferometry processing on the acoustic returns to produce two and/or three-dimensional sonar imagery. In some embodiments, one or more sonar transmitters of sonar system 110 may be configured to use CHIRP transmissions to improve range resolution and hence reduce ambiguities typically inherent in interferometry processing techniques.

In various embodiments, sonar system 110 may be implemented with optional orientation and/or position sensors (e.g., similar to orientation sensor 140, gyroscope/accelerometer 144, and/or GNSS 146) that may be incorporated within the transducer assembly housing to provide three dimensional orientations and/or positions of the transducer assembly and/or transducer(s) for use when processing or post processing sonar data for display. The sensor information can be used to correct for movement of the transducer assembly between ensonifications to provide improved alignment of corresponding acoustic returns/samples, for example, and/or to generate imagery based on the measured orientations and/or positions of the transducer assembly. In other embodiments, an external orientation and/or position sensor can be used alone or in combination with an integrated sensor or sensors.

In embodiments where sonar system 110 is implemented with a position sensor, sonar system 110 may be configured to provide a variety of sonar data and/or imagery enhancements. For example, sonar system 110 may be configured to provide accurate positioning of sonar data and/or user-defined waypoints remote from mobile system 101. Similarly, sonar system 110 may be configured to provide accurate two and/or three-dimensional aggregation and/or display of a series of sonar data; without position data, a sonar system typically assumes a straight track, which can cause image artifacts and/or other inaccuracies in corresponding sonar data and/or imagery. Additionally, when implemented with a position sensor and/or interfaced with a remote but relatively fixed position sensor (e.g., GNSS 146), sonar system 110 may be configured to generate accurate and detailed bathymetric views of a floor of a body of water.

In embodiments where sonar system 110 is implemented with an orientation and/or position sensor, sonar system 110 may be configured to store such location/position information along with other sensor information (acoustic returns, temperature measurements, text descriptions, water depth, altitude, mobile structure speed, and/or other sensor and/or control information) available to system 100. In some embodiments, controller 130 may be configured to generate a look up table so that a user can select desired configurations of sonar system 110 for a particular location or to coordinate with some other sensor information. Alternatively, an automated adjustment algorithm can be used to select optimum configurations based on the sensor information.

For example, in one embodiment, mobile structure 101 may be located in an area identified on a chart using position data, a user may have selected a user setting for a configuration of sonar system 110, and controller 130 may be configured to control an actuator and/or otherwise implement the configuration for sonar system 110 (e.g., to set a particular orientation). In still another embodiment, controller 130 may be configured to receive orientation measurements for mobile structure 101. In such an embodiment, controller 130 may be configured to control the actuators associated with the transducer assembly to maintain its orientation relative to, for example, mobile structure 101 and/or the water surface, and thus improve the displayed sonar images (e.g., by ensuring consistently oriented acoustic beams and/or proper registration of a series of acoustic returns). In various embodiments, controller 130 may be configured to control steering sensor/actuator 150 and/or propulsion system 170 to adjust a position and/or orientation of mobile structure 101 to help ensure proper registration of a series of acoustic returns, sonar data, and/or sonar imagery.

Although FIG. 1A shows various sensors and/or other components of system 100 separate from sonar system 110, in other embodiments, any one or combination of sensors and components of system 100 may be integrated with a sonar assembly, an actuator, a transducer module, and/or other components of sonar system 110. For example, orientation sensor 140 may be integrated with a transducer module of sonar system 110 and be configured to provide measurements of an absolute and/or relative orientation (e.g., a roll, pitch, and/or yaw) of the transducer module to controller 130 and/or user interface 120, both of which may also be integrated with sonar system 110. Still other embodiments may not include the sonar system 110 but may include other sensor assemblies and other components.

User interface 120 may be implemented as a display, a graphical user interface, a touch screen, a keyboard, a mouse, a joystick, a knob, a steering wheel, a ship's wheel or helm, a yoke, and/or any other device capable of accepting user input and/or providing feedback to a user. In various embodiments, user interface 120 may be adapted to provide user input (e.g., as a type of signal and/or sensor information) to other devices of system 100, such as controller 130. User interface 120 may also be implemented with one or more logic devices that may be adapted to execute instructions, such as software instructions, implementing any of the various processes and/or methods described herein. For example, user interface 120 may be adapted to form communication links, transmit and/or receive communications (e.g., sensor signals, control signals, sensor information, user input, and/or other information), determine various coordinate frames and/or orientations, determine parameters for one or more coordinate frame transformations, and/or perform coordinate frame transformations, for example, or to perform various other processes and/or methods.

In various embodiments, user interface 120 may be adapted to accept user input, for example, to form a communication link, to select a particular wireless networking protocol and/or parameters for a particular wireless networking protocol and/or wireless link (e.g., a password, an encryption key, a MAC address, a device identification number, a device operation profile, parameters for operation of a device, and/or other parameters), to select a method of processing sensor signals to determine sensor information, to adjust a position and/or orientation of an articulated sensor, and/or to otherwise facilitate operation of system 100 and devices within system 100. Once user interface 120 accepts a user input, the user input may be transmitted to other devices of system 100 over one or more communication links.

In one embodiment, user interface 120 may be adapted to receive a sensor or control signal (e.g., from orientation sensor 140, a position sensor, and/or steering sensor/actuator 150) over communication links formed by one or more associated logic devices, for example, and display sensor and/or other information corresponding to the received sensor or control signal to a user. In related embodiments, user interface 120 may be adapted to process sensor and/or control signals to determine sensor and/or other information. For example, a sensor signal may include an orientation, an angular velocity, an acceleration, a speed, and/or a position of mobile structure 101. In such embodiment, user interface 120 may be adapted to process the sensor signals to determine sensor information indicating an estimated and/or absolute roll, pitch, and/or yaw (attitude and/or rate), and/or a position or series of positions of mobile structure 101, for example, and display the sensor information as feedback to a user. In one embodiment, user interface 120 may be adapted to display a time series of various sensor information and/or other parameters as part of or overlaid on a graph or map, which may be referenced to a position and/or orientation of mobile structure 101. For example, user interface 120 may be adapted to display a time series of positions, headings, and/or orientations of mobile structure 101 and/or other elements of system 100 (e.g., a transducer assembly and/or module of sonar system 110) overlaid on a geographical map, which may include one or more graphs indicating a corresponding time series of actuator control signals, sensor information, and/or other sensor and/or control signals. In this manner, time data may be associated with the sensor data received from the plurality of sensors. The time data may be generated by a time module associated with system 100, such as a clock. Additionally, user interface 120 may also be adapted to display a 2D or 3D integrated model that may combine sensor data from a plurality of sensors.

In some embodiments, user interface 120 may be adapted to accept user input including a user-defined target heading, route, and/or orientation for a transducer module, for example, and to generate control signals for steering sensor/actuator 150 and/or propulsion system 170 to cause mobile structure 101 to move according to the target heading, route, and/or orientation. In further embodiments, user interface 120 may be adapted to accept user input including a user-defined target attitude for an actuated device (e.g., sonar system 110) coupled to mobile structure 101, for example, and to generate control signals for adjusting an orientation of the actuated device according to the target attitude. More generally, user interface 120 may be adapted to display sensor information to a user, for example, and/or to transmit sensor information and/or user input to other user interfaces, sensors, or controllers of system 100, for instance, for display and/or further processing. In one embodiment, user interface 120 may be integrated with one or more sensors (e.g., imaging modules, position and/or orientation sensors, other sensors) and/or be portable (e.g., such as a portable touch display or smart phone, for example, or a wearable user interface) to facilitate user interaction with various systems of mobile structure 101.

Controller 130 may be implemented as any appropriate logic device (e.g., processing device, microcontroller, processor, application specific integrated circuit (ASIC), field programmable gate array (FPGA), memory storage device, memory reader, or other device or combinations of devices) that may be adapted to execute, store, and/or receive appropriate instructions, such as software instructions implementing a control loop for controlling various operations of sonar system 110, steering sensor/actuator 150, mobile structure 101, and/or system 100, for example. Such software instructions may also implement methods for processing sensor signals, determining sensor information, providing user feedback (e.g., through user interface 120), querying devices for operational parameters, selecting operational parameters for devices, or performing any of the various operations described herein (e.g., operations performed by logic devices of various devices of system 100).

In addition, a machine-readable medium may be provided for storing non-transitory instructions for loading into and execution by controller 130. In these and other embodiments, controller 130 may be implemented with other components where appropriate, such as volatile memory, non-volatile memory, one or more interfaces, and/or various analog and/or digital components for interfacing with devices of system 100. For example, controller 130 may be adapted to store sensor signals, sensor information, parameters for coordinate frame transformations, calibration parameters, sets of calibration points, and/or other operational parameters, over time, for example, and provide such stored data to a user using user interface 120. In some embodiments, controller 130 may be integrated with one or more user interfaces (e.g., user interface 120), and, in one embodiment, may share a communication module or modules. As noted herein, controller 130 may be adapted to execute one or more control loops for actuated device control, steering control (e.g., using steering sensor/actuator 150) and/or performing other various operations of mobile structure 101 and/or system 100. In some embodiments, a control loop may include processing sensor signals and/or sensor information in order to control one or more operations of mobile structure 101 and/or various elements of system 100.

Orientation sensor 140 may be implemented as one or more of a compass, float, accelerometer, magnetometer, and/or other digital or analog device capable of measuring an orientation of mobile structure 101 (e.g., magnitude and direction of roll, pitch, and/or yaw, relative to one or more reference orientations such as gravity and/or Magnetic North) and providing such measurements as sensor signals that may be communicated to various devices of system 100. In some embodiments, orientation sensor 140 may be adapted to provide heading measurements for mobile structure 101. In other embodiments, orientation sensor 140 may be adapted to provide roll, pitch, and/or yaw rates for mobile structure 101 (e.g., using a time series of orientation measurements). Orientation sensor 140 may be positioned and/or adapted to make orientation measurements in relation to a particular coordinate frame of mobile structure 101, for example.

Speed sensor 142 may be implemented as an electronic pitot tube, metered gear or wheel, water speed sensor, wind speed sensor, a wind velocity sensor (e.g., direction and magnitude) and/or other device capable of measuring or determining a linear speed of mobile structure 101 (e.g., in a surrounding medium and/or aligned with a longitudinal axis of mobile structure 101) and providing such measurements as sensor signals that may be communicated to various devices of system 100. In some embodiments, speed sensor 142 may be adapted to provide a velocity of a surrounding medium relative to sensor 142 and/or mobile structure 101.

Gyroscope/accelerometer 144 may be implemented as one or more electronic sextants, semiconductor devices, integrated chips, accelerometer sensors, accelerometer sensor systems, or other devices capable of measuring angular velocities/accelerations and/or linear accelerations (e.g., direction and magnitude) of mobile structure 101 and providing such measurements as sensor signals that may be communicated to other devices of system 100 (e.g., user interface 120, controller 130). Gyroscope/accelerometer 144 may be positioned and/or adapted to make such measurements in relation to a particular coordinate frame of mobile structure 101, for example. In various embodiments, gyroscope/accelerometer 144 may be implemented in a common housing and/or module to ensure a common reference frame or a known transformation between reference frames.

GNSS 146 may be implemented according to any global navigation satellite system (GNSS), including a GPS, GLONASS, and/or Galileo based receiver and/or other device capable of determining absolute and/or relative position of mobile structure 101 (e.g., or an element of mobile structure 101 and/or system 100, such as sonar system 110 and/or user interface 120) based on wireless signals received from space-born and/or terrestrial sources (e.g., eLoran, and/or other at least partially terrestrial systems), for example, and capable of providing such measurements as sensor signals that may be communicated to various devices of system 100. In some embodiments, GNSS 146 may be adapted to determine a velocity, speed, and/or yaw rate of mobile structure 101 (e.g., using a time series of position measurements), such as an absolute velocity and/or a yaw component of an angular velocity of mobile structure 101. In various embodiments, one or more logic devices of system 100 may be adapted to determine a calculated speed of mobile structure 101 and/or a computed yaw component of the angular velocity from such sensor information.

Steering sensor/actuator 150 may be adapted to physically adjust a heading of mobile structure 101 according to one or more control signals, user inputs, and/or stabilized attitude estimates provided by a logic device of system 100, such as controller 130. Steering sensor/actuator 150 may include one or more actuators and control surfaces (e.g., a rudder or other type of steering or trim mechanism) of mobile structure 101, for example, and may be adapted to physically adjust the control surfaces to a variety of positive and/or negative steering angles/positions.

Propulsion system 170 may be implemented as a propeller, turbine, or other thrust-based propulsion system, a mechanical wheeled and/or tracked propulsion system, a sail-based propulsion system, and/or other types of propulsion systems that can be used to provide motive force to mobile structure 101. In some embodiments, propulsion system 170 may be non-articulated, for example, such that the direction of motive force and/or thrust generated by propulsion system 170 is fixed relative to a coordinate frame of mobile structure 101. Non-limiting examples of non-articulated propulsion systems include, for example, an inboard motor for a watercraft with a fixed thrust vector, for example, or a fixed aircraft propeller or turbine. In other embodiments, propulsion system 170 may be articulated, for example, and may be coupled to and/or integrated with steering sensor/actuator 150, for example, such that the direction of generated motive force and/or thrust is variable relative to a coordinate frame of mobile structure 101. Non-limiting examples of articulated propulsion systems include, for example, an outboard motor for a watercraft, an inboard motor for a watercraft with a variable thrust vector/port (e.g., used to steer the watercraft), a sail, or an aircraft propeller or turbine with a variable thrust vector, for example.

Other modules 180 may include other and/or additional sensors, actuators, communications modules/nodes, and/or user interface devices used to provide additional environmental information of mobile structure 101, for example. In some embodiments, other modules 180 may include a humidity sensor, a wind and/or water temperature sensor, a barometer, a radar system, a visible spectrum camera, an infrared camera, LIDAR systems, a salinity sensor such as a sea surface salinity sensor, and/or other environmental sensors providing measurements and/or other sensor signals that can be displayed to a user and/or used by other devices of system 100 (e.g., controller 130) to provide operational control of mobile structure 101 and/or system 100 that compensates for environmental conditions, such as wind speed and/or direction, swell speed, amplitude, and/or direction, and/or an object in a path of mobile structure 101, for example. In some embodiments, other modules 180 may include one or more actuated devices (e.g., spotlights, infrared and/or visible light illuminators, infrared and/or visible light cameras, radars, sonars, LIDAR systems, and/or other actuated devices) coupled to mobile structure 101, where each actuated device includes one or more actuators adapted to adjust an orientation of the device, relative to mobile structure 101, in response to one or more control signals (e.g., provided by controller 130). Additionally, other modules 180 may also include orientation and/or position sensors associated with sensors of the other modules 180. The orientation and/or position sensors may be incorporated within the sensors of the other modules 180, for example, or may be separate from the sensors of the other modules 180.

In general, each of the elements of system 100 may be implemented with any appropriate logic device (e.g., processing device, microcontroller, processor, application specific integrated circuit (ASIC), field programmable gate array (FPGA), memory storage device, memory reader, or other device or combinations of devices) that may be adapted to execute, store, and/or receive appropriate instructions, such as software instructions implementing a method for providing sonar data and/or imagery, for example, or for transmitting and/or receiving communications, such as sensor signals, sensor information, and/or control signals, between one or more devices of system 100. In one embodiment, such method may include instructions to receive an orientation, acceleration, position, and/or speed of mobile structure 101 and/or sonar system 110 from various sensors, to determine a transducer orientation adjustment (e.g., relative to a desired transducer orientation) from the sensor signals, and/or to control an actuator to adjust a transducer orientation accordingly, for example, as described herein. In a further embodiment, such method may include instructions for forming one or more communication links between various devices of system 100.

In addition, one or more machine readable mediums may be provided for storing non-transitory instructions for loading into and execution by any logic device implemented with one or more of the devices of system 100. In these and other embodiments, the logic devices may be implemented with other components where appropriate, such as volatile memory, non-volatile memory, and/or one or more interfaces (e.g., inter-integrated circuit (I2C) interfaces, mobile industry processor interfaces (MIPI), joint test action group (JTAG) interfaces (e.g., IEEE 1149.1 standard test access port and boundary-scan architecture), and/or other interfaces, such as an interface for one or more antennas, or an interface for a particular type of sensor).

Each of the elements of system 100 may be implemented with one or more amplifiers, modulators, phase adjusters, beamforming components, digital to analog converters (DACs), analog to digital converters (ADCs), various interfaces, antennas, transducers, and/or other analog and/or digital components enabling each of the devices of system 100 to transmit and/or receive signals, for example, in order to facilitate wired and/or wireless communications between one or more devices of system 100. Such components may be integrated with a corresponding element of system 100, for example. In some embodiments, the same or similar components may be used to perform one or more sensor measurements, as described herein.

For example, the same or similar components may be used to create an acoustic pulse (e.g., a transmission control signal and/or a digital shaping control signal), convert the acoustic pulse to an excitation signal (e.g., a shaped or unshaped transmission signal) and transmit it to a sonar transducer element to produce an acoustic beam, receive an acoustic return (e.g., a sound wave received by the sonar transducer element and/or corresponding electrical signals from the sonar transducer element), convert the acoustic return to acoustic return data, and/or store sensor information, configuration data, and/or other data corresponding to operation of a sonar system, as described herein. In addition, the same or similar components may be used to facilitate operation of a radar system (e.g., other modules 180), for example, or other types of ranging sensor systems.

Sensor signals, control signals, and other signals may be communicated among elements of system 100 using a variety of wired and/or wireless communication techniques, including voltage signaling, Ethernet, WiFi, Bluetooth, Zigbee, Xbee, Micronet, or other medium and/or short range wired and/or wireless networking protocols and/or implementations, for example. In such embodiments, each element of system 100 may include one or more modules supporting wired, wireless, and/or a combination of wired and wireless communication techniques.

In some embodiments, various elements or portions of elements of system 100 may be integrated with each other, for example, or may be integrated onto a single printed circuit board (PCB) to reduce system complexity, manufacturing costs, power requirements, and/or timing errors between the various sensor measurements. For example, gyroscope/accelerometer 144, user interface 120, and controller 130 may be configured to share one or more components, such as a memory, a logic device, a communications module, and/or other components, and such sharing may act to reduce and/or substantially eliminate such timing errors while reducing overall system complexity and/or cost.

Each element of system 100 may include one or more batteries or other electrical power storage devices, for example, and may include one or more solar cells or other electrical power generating devices (e.g., a wind or water-powered turbine, or a generator producing electrical power from motion of one or more elements of system 100). In some embodiments, one or more of the devices may be powered by a power source for mobile structure 101, using one or more power leads. Such power leads may also be used to support one or more communication techniques between elements of system 100.

In various embodiments, a logic device of system 100 (e.g., of orientation sensor 140 and/or other elements of system 100) may be adapted to determine parameters (e.g., using signals from various devices of system 100) for transforming a coordinate frame of sonar system 110 and/or other sensors of system 100 to/from a coordinate frame of mobile structure 101, at-rest and/or in-motion, and/or other coordinate frames, as described herein. One or more logic devices of system 100 may be adapted to use such parameters to transform a coordinate frame of sonar system 110 and/or other sensors of system 100 to/from a coordinate frame of orientation sensor 140 and/or mobile structure 101, for example. Furthermore, such parameters may be used to determine and/or calculate one or more adjustments to an orientation of sonar system 110 that would be necessary to physically align a coordinate frame of sonar system 110 with a coordinate frame of orientation sensor 140 and/or mobile structure 101, for example, or an absolute coordinate frame. Adjustments determined from such parameters may be used to selectively power adjustment servos/actuators (e.g., of sonar system 110 and/or other sensors or elements of system 100), for example, or may be communicated to a user through user interface 120, as described herein.

In certain embodiments, system 100 may include additional orientation and/or position sensors (OPSs) integrated with mobile structure 101. The OPSs may be individually coupled to mobile structure 101 or may be contained within other modules and systems such as sonar system 110 and/or various imaging systems. The orientation and/or position sensors may detect a position of mobile structure 101 relative to a fixed point, such as a home or base location as defined by a user through user interface 120. In some embodiments, the orientation and/or position sensors may detect the absolute position of mobile structure 101, such as the absolute position of mobile structure 101 within a geographic coordinate system (latitude and longitude). In some embodiments, the system may include one or more position sensors distinct from one or more orientation sensors such that the one or more position sensors provide positional data of the system 100 and/or mobile structure 101 and the one or more orientation sensors provide orientation data of the system 100 and/or mobile structure 101. Data output from the orientation and/or position sensors may help define navigational waypoints as set by user input via user interface 120. For example, each navigational waypoint may be defined by position data received from at least one position sensor. Each navigational waypoint may include a time stamp indicating the date and/or time the navigational waypoint was created.

The orientation and/or position sensors may detect the roll, pitch, and/or yaw of mobile structure 101 and output data related to the roll, pitch, and/or yaw to controller 130. Controller 130 may then utilize roll, pitch, and/or yaw to correct data obtained by various sensors and systems coupled to mobile structure 101 (e.g., sonar, radar, and/or other ranging sensor systems, and/or other sensors). For example, sonar data of a seafloor may be significantly affected by roll, pitch, and/or yaw of a mobile structure because emitted sonar pulses may then travel to the ocean floor at an angle, which can significantly increase the detected distance. Using data related to corresponding angles of roll, pitch, and/or yaw, controller 130 may then correct or otherwise adjust such erroneous readings.

Figure 1B:
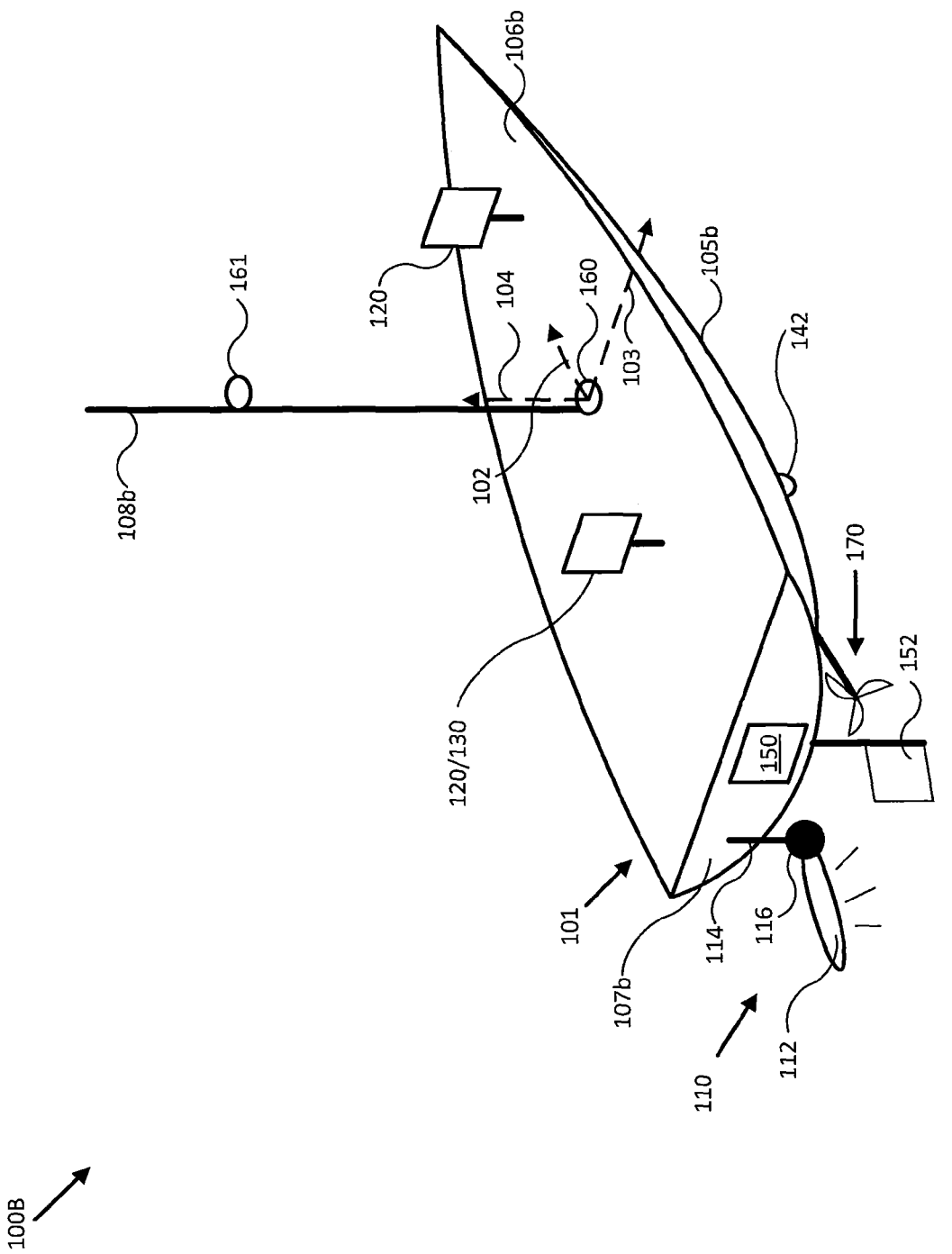
FIG. 1B illustrates a diagram of a mobile structure with a navigation system in accordance with an embodiment of the disclosure.

FIG. 1B illustrates a diagram of a mobile structure with a navigation system in accordance with an embodiment of the disclosure. In the embodiment shown in FIG. 1B, system 100B may be implemented to provide navigational data, such as an integrated model or some data outputs to the user, for use with operation of mobile structure 101, similar to system 100 of FIG. 1B. For example, system 100B may include sonar system 110, integrated user interface/controller 120/130, secondary user interface 120, steering sensor/actuator 150, sensor cluster 160 (e.g., orientation sensor 140, gyroscope/accelerometer 144, GNSS 146, and/or other modules 180), imager cluster 161 (e.g., and/or other modules 180, such a radar systems), and various other sensors and/or actuators. In the embodiment illustrated by FIG. 1B, mobile structure 101 is implemented as a motorized boat including a hull 105b, a deck 106b, a transom 107b, a mast/sensor mount 108b, a rudder 152, an inboard motor 170, and an actuated sonar system 110 coupled to transom 107b. In other embodiments, hull 105b, deck 106b, mast/sensor mount 108b, rudder 152, inboard motor 170, and various actuated devices may correspond to attributes of a passenger aircraft or other type of vehicle, robot, or drone, for example, such as an undercarriage, a passenger compartment, an engine/engine compartment, a trunk, a roof, a steering mechanism, a headlight, a radar system, and/or other portions of a vehicle.

As depicted in FIG. 1B, mobile structure 101 includes actuated sonar system 110, which in turn includes transducer assembly 112 coupled to transom 107b of mobile structure 101 through assembly bracket/actuator 116 and transom bracket/electrical conduit 114. In some embodiments, assembly bracket/actuator 116 may be implemented as a roll, pitch, and/or yaw actuator, for example, and may be adapted to adjust an orientation of transducer assembly 112 according to control signals and/or an orientation (e.g., roll, pitch, and/or yaw) or position of mobile structure 101 provided by user interface/controller 120/130. For example, user interface/controller 120/130 may be adapted to receive an orientation of transducer assembly 112 configured to ensonify a portion of surrounding water and/or a direction referenced to an absolute coordinate frame, and to adjust an orientation of transducer assembly 112 to retain ensonification of the position and/or direction in response to motion of mobile structure 101, using one or more orientations and/or positions of mobile structure 101 and/or other sensor information derived by executing various methods described herein.

In another embodiment, user interface/controller 120/130 may be configured to adjust an orientation of transducer assembly 112 to direct sonar transmissions from transducer assembly 112 substantially downwards and/or along an underwater track during motion of mobile structure 101. In such embodiment, the underwater track may be predetermined, for example, or may be determined based on criteria parameters, such as a minimum allowable depth, a maximum ensonified depth, a bathymetric route, and/or other criteria parameters. Transducer assembly 112 may be implemented with a sonar orientation and/or position sensor (OPS), which may include one or more sensors corresponding to orientation sensor 140, gyroscope/accelerometer 144 and/or GNSS 146, for example, that is configured to provide absolute and/or relative positions and/or orientations of transducer assembly 112 to facilitate actuated orientation of transducer assembly 112.

In one embodiment, user interfaces 120 may be mounted to mobile structure 101 substantially on deck 106b and/or mast/sensor mount 108b. Such mounts may be fixed, for example, or may include gimbals and other leveling mechanisms/actuators so that a display of user interfaces 120 can stay substantially level with respect to a horizon and/or a "down" vector (e.g., to mimic typical user head motion/orientation), for example, or so the display can be oriented according to a user's desired view. In another embodiment, at least one of user interfaces 120 may be located in proximity to mobile structure 101 and be mobile/portable throughout a user level (e.g., deck 106b) of mobile structure 101. For example, a secondary user interface 120 may be implemented with a lanyard, strap, headband, and/or other type of user attachment device and be physically coupled to a user of mobile structure 101 so as to be in proximity to the user and mobile structure 101. Other embodiments of user interface 120 may include a portable device that is not physically coupled to the user and/or mobile structure 101. In various embodiments, user interface 120 may be implemented with a relatively thin display that is integrated into a PCB or other electronics of the corresponding device or structure in order to reduce size, weight, housing complexity, and/or manufacturing costs.

As shown in FIG. 1B, in some embodiments, speed sensor 142 may be mounted to a portion of mobile structure 101, such as to hull 105b, and be adapted to measure a relative water speed. In some embodiments, speed sensor 142 may be adapted to provide a thin profile to reduce and/or avoid water drag. In various embodiments, speed sensor 142 may be mounted to a portion of mobile structure 101 that is substantially outside easy operational accessibility. Speed sensor 142 may include one or more batteries and/or other electrical power storage devices, for example, and may include one or more water-powered turbines to generate electrical power. In other embodiments, speed sensor 142 may be powered by a power source for mobile structure 101, for example, using one or more power leads penetrating hull 105b. In alternative embodiments, speed sensor 142 may be implemented as a wind velocity sensor, for example, and may be mounted to mast/sensor mount 108b to have relatively clear access to local wind.

In the embodiment illustrated by FIG. 1B, mobile structure 101 includes direction/longitudinal axis 102, direction/lateral axis 103, and direction/vertical axis 104 meeting approximately at mast/sensor mount 108b (e.g., near a center of gravity of mobile structure 101). In one embodiment, the various axes may define a coordinate frame of mobile structure 101, for example, and/or of sensor cluster 160 and/or other sensors of system 100B. Each sensor adapted to measure a direction (e.g., velocities, accelerations, headings, or other states including a directional component) may be implemented with a mount, actuators, and/or servos that can be used to align a coordinate frame of the sensor with a coordinate frame of any element of system 100B and/or mobile structure 101. Each element of system 100B may be located at positions different from those depicted in FIG. 1B. Each device of system 100B may include one or more batteries or other electrical power storage devices, for example, and may include one or more solar cells or other electrical power generating devices. In some embodiments, one or more of the devices may be powered by a power source for mobile structure 101. As noted herein, each element of system 100B may be implemented with an antenna, a logic device, and/or other analog and/or digital components enabling that element to provide, receive, and process sensor signals and interface or communicate with one or more devices of system 100B. Further, a logic device of that element may be adapted to perform any of the methods described herein.

Figure 2:
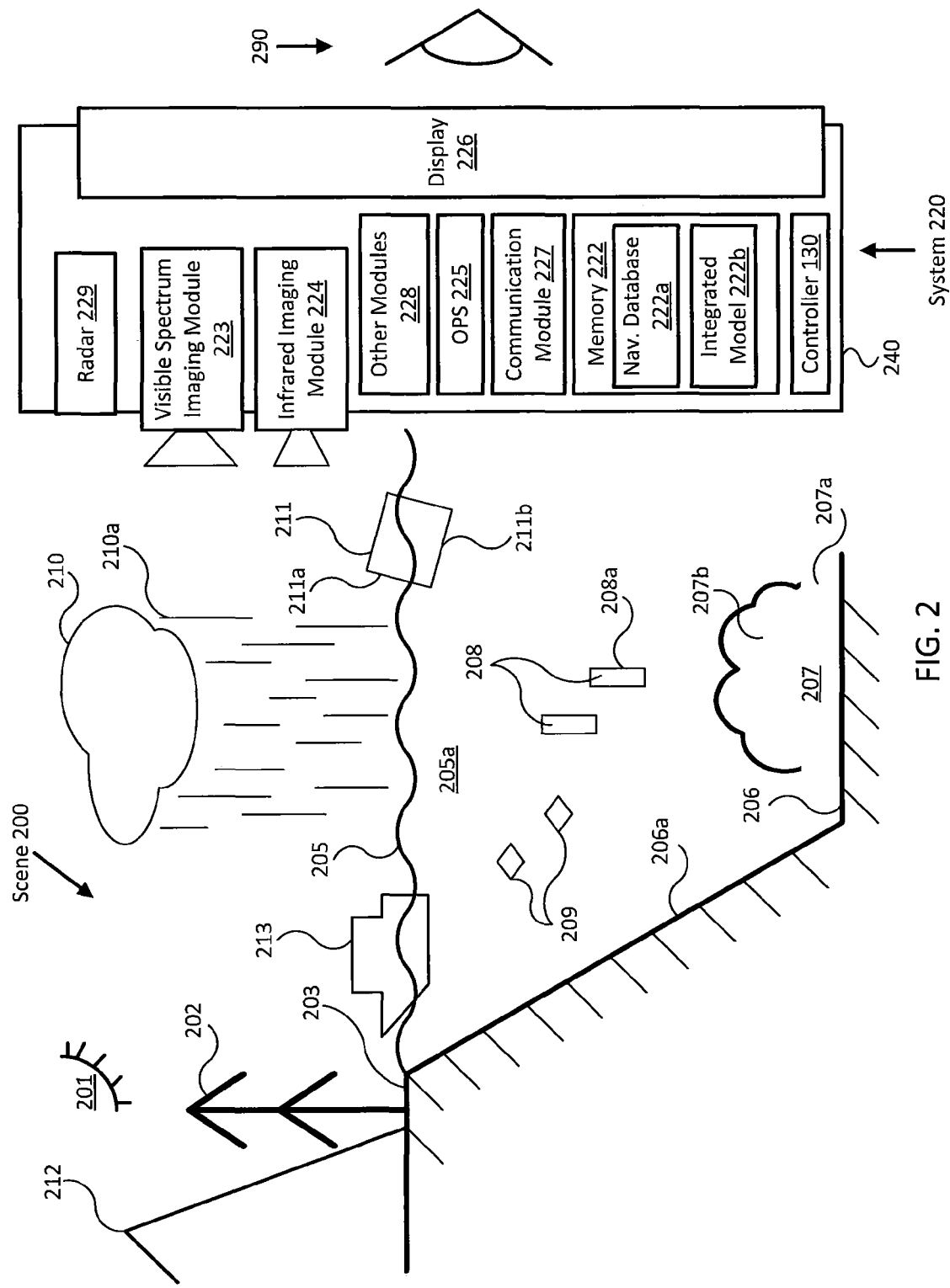
FIG. 2 illustrates a diagram of a navigation system in accordance with an embodiment of the disclosure.

FIG. 2 illustrates a diagram of a navigation system in accordance with an embodiment of the disclosure. In various embodiments, system 220 may be implemented with similar functionality as that described with reference to user interface 120 and/or controller 130 in FIGS. 1A and 1B. In the embodiment shown in FIG. 2, system 220 may be configured to provide visible spectrum imagery (e.g., using a visible spectrum imaging module 223), infrared spectrum imagery (using infrared imaging module 224), sonar imagery (using sonar system 110 of FIGS. 1A and 1B), and/or radar imagery (using radar system 229) of scene 200 to a user 290 viewing a display 226. For example, system 220 may be configured to display rendered image data (e.g., provided by imaging modules 223 and/or 224) and/or radar data in a portion of a field of view (FOV) of display 226 that is above waterline 205 and to display rendered sonar data in a portion of the FOV that is below waterline 205.

Image data provided by imaging modules 223 and/or 224 as well as radar data provided by radar 229 may include an image of a surface of a body of water 205a and various objects or structures above waterline 205, such as the sun 201, a tree 202, a beach 203, a hill 212, cloud 210, rain 210a, floating object 211 or floating object 211a (the part of the floating object 211 above the waterline), and/or vehicle 213. Such image data may be processed using feature/pattern recognition techniques to determine a location of waterline 205 within the image data (e.g., if imaging modules 223 and/or 224 are oriented to capture a portion of scene 200 including waterline 205). Sonar data, which may be provided by bathymetric charts and/or past or current use of sonar system 110 of FIGS. 1A and 1B, may include data representative of waterline 205, a floor 206 of body of water 205a, a bank 206a of floor 206, a bottom feature 207 (e.g., a rock or sunken ship), fish 208 (or other fish, game, wildlife, and/or other flora and fauna), other submerged objects 209 (e.g., trash, seaweed), floating object 211b (the part of the floating object 211 below the waterline), and/or other underwater features within or surrounding body of water 205a.

A sea state of the body of water 205a may also be determined using data from data including image data. For example, as shown in FIG. 2, waterline 205 may be choppy. Analysis of the visual and/or thermal imaging data from the visible imaging module 223 and/or the infrared imaging module 224 may determine the choppiness of waterline 205 and, thus, determine at least a portion of the sea state of body of water 205a. In certain embodiments, such a sea state (e.g., sea calmness or choppiness) may be rendered or communicated within an integrated model by, for example, graphical representations (e.g., animating the sea state in a 2D or 3D manner or through representations of the sea state using sea state indicators) or textual representations (e.g., text describing the sea state or rating the sea state according to a sea state scale such as a numerical scale).

Data from the modules within system 220 or system 100 may be combined within a navigational database. The navigational database may, for example, be contained within memory 222 (e.g., navigational database 222a within memory 222) and may be communicatively connected to other components within system 100 and/or the system 220. Navigational database 222a may receive data from one or both of system 100 or system 220. Additionally, navigational database 222a may receive data from other modules, sensors, imaging systems, or devices that may or may not be coupled with mobile structure 101. For example, navigational database 222a may receive data from a smartphone of a user, from other vehicles, from GNSS satellites, from fixed devices such as traffic control services, from other communications systems such as radios and laser communications, and from cloud based interior database. In certain such embodiments, communication module 227 may transmit and/or receive navigational database 222a. Communication module 227 may be stabilized and may utilize orientation and/or position data to stabilize communication module 227 to better transfer and/or receive data. Such stabilization may reduce bandwidth requirements of a network.

For the purposes of this disclosure, any and all data that may directly or indirectly aid in the navigation of a vehicle may be considered navigational data. Also, the navigational database may combine navigational data of navigation sensors from any or all appropriate sources. The navigational database may also include orientation and/or position data from and/or associated with the navigation sensors. In certain embodiments, the navigational database may receive data from other sensors via communication module 227.

Navigational database 222a may, in certain embodiments, be used to aid in navigation of mobile structure 101 by fusing together data from a plurality of sensors. The data may be fused in a manner to aid in the navigation of mobile structure 101 or assist in the presentation of the data to an operator of mobile structure 101 or a user of a display in a manner that may make the presentation easier to understand, more complete, and/or more informative. In certain embodiments, an operator may be a person in operational control of mobile structure 101, while a user may be a person in control of an electronic device that may contain the display. The operator and/or the user may be the same person or may be different people.

For example, navigational database 222a may include data from sonar system 110, visible spectrum imaging module 223, infrared imaging module 224, radar 229, and/or other navigation sensors of system 220. Controller 130 may be configured to generate an integrated model (e.g., integrated model 222b) from at least some of the data within navigational database 222a. Integrated model 222b may be, for example, a 2D or 3D representation of an environment near mobile structure 101. Integrated model 222b may present the environment from substantially the point of view of the viewer of the vehicle (e.g., from the point of view of a bridge of a watercraft or from the point of view of where an imaging sensor may be located), from a top down point of view, from a perspective or angled view, or from a free-form view (i.e., where a user may select a viewpoint).

In certain embodiments, the integrated model 222b may combine data from multiple sensors, such as, for example, data from sonar system 110, visible spectrum imaging module 223, infrared imaging module 224, and/or radar 229. Integrated model 222b may combine data from multiple sensors into one view. Integrated model 222b may comprise a rendering of a virtual representation of the environment (e.g., render the environment from scratch, such as with a full 3D model) or may use data from one or more sensors as a base view and render additional data "on top" of the base view, such as in an overlay with variable transparency, for instance.

For example, data from visible spectrum imaging module 223 may be selected for the base view and data from infrared imaging module 224, sonar system 110, and/or radar 229 may be rendered "on top" of the base view. Accordingly, using the example of the scene 200 in FIG. 2, the base view may be a visual view from visible spectrum imaging module 223. Due to rain 210a, visible spectrum imaging module 223 may not be able to detect vehicle 213 behind rain 210a. However, radar 229 and/or infrared imaging module 224 may be able to detect vehicle 213 through rain 210a. Thus, in a certain embodiment of the integrated model, the radar image and/or the thermal image of vehicle 213 may be included in the view of the visible image from visible spectrum imaging module 223. Thus, the integrated model may, in addition to displaying data from visible spectrum imaging module 223, also overlay radar and/or thermal image of vehicle 213 within the integrated model. Accordingly, an operator/user may be aware of the presence of vehicle 213 even though vehicle 213 may not be visible in the visual spectrum.

Additionally, or alternatively, features detected by sonar system 110 may also be incorporated into the integrated model. For example, sonar system 110 may detect and/or output data representative of waterline 205, floor 206 of body of water 205a, bank 206a of floor 206, bottom feature 207 (e.g., a rock or sunken ship), fish 208, other submerged objects 209 (e.g., trash, seaweed), floating object 211b, and/or other underwater features within or surrounding body of water 205a. Such underwater features may be rendered within the integrated model. Such underwater features may be indicated and/or differentiated within the integrated model from, for example, features above the water line through use of any combination of contour lines, color and/or greyscale mapping and/or shading, three-dimensional rendering, and/or other volumetric rendering techniques. In some embodiments, surface orientations of various underwater features (e.g., of side 207a or top 207b of bottom feature 207, or of side 208a of fish 208) may be detected and/or differentiated using similar sonar data and/or image processing techniques.

In various embodiments, integrated model 222b may be generated from the navigational database 222a and shown on display 226. The portions of any of image data from visible spectrum imaging module 223 and infrared imaging module 224, sonar data from sonar system 110, radar data from radar 229, GNSS data from the GNSS 146, and other data from other navigation sensors that are rendered and displayed by display 226, and the techniques used to render the imagery, may be selected based on a point of view of display 226 to provide a view fusing the data of multiple navigation sensors.

Such fusing may be demonstrated in an example where the position of mobile structure 101 is determined. In certain embodiments, the resolution of GNSS data may result in positional errors of multiple feet. Additionally, connection to various GNSS satellites may be periodically lost and GNSS 146 may be miscalibrated or otherwise inaccurate. In such instances, system 100 and/or 220 may utilize data from other sensors to complement or supplement the GNSS data. For example, image data, sonar data, and/or radar data may be used to help determine the position of mobile structure 101. Such data may allow controller 221 to analyze the data and determine the position of mobile structure 101 according to the data.

For example, controller 221 may roughly determine the position of mobile structure 101 from current or outdated GNSS data, determine landmarks in the environment around mobile structure 101, and then may use image, sonar, and/or radar data to locate such landmarks within the data. Controller 221 may then determine the distance from mobile structure 101 to one or more such landmarks and, thus, determine the location of mobile structure 101. In certain such embodiments using image data, there may be a plurality of visual and/or thermal imaging modules 223 and/or 224. The plurality of imaging modules may be configured to allow the controller to determine a distance of mobile structure 101 to the landmark imaged. In such embodiments, visual and/or thermal imaging modules 223 and/or 224 may additionally include corresponding OPSs. The orientation and/or position data from the OPSs may also aid in determining the position of mobile structure 101.

In a further embodiment, the position of mobile structure 101 may be determined from both the GNSS data and other data (e.g., the controller may determine a first position of mobile structure 101 from the GNSS data and may independently determine a second position of mobile structure 101 from other data). The GNSS data may then be aligned with other data to generate an integrated model. Aligning may associate an aspect of the GNSS data to an aspect of another navigational data. Aligning may include, for example, determining a global position of a detected terrain feature (e.g., an underwater ridge detected by sonar may be determined to be positioned in an area indicated by GNSS to include an underwater ridge), combining GNSS data with detected weather conditions (to determine the position of the weather condition), and/or other techniques that may combine GNSS data with other navigational data to increase the accuracy of the navigational data, better present the data to a user, and/or other improvements.

Additionally, in certain embodiments, a position determined from the GNSS data may then be compared to the position determined from the other sensors and any mismatches may be highlighted in the rendering of the integrated model. In certain embodiments, controller 130 may also include algorithms to, if a mismatch is detected, render the integrated model according to data from a preferred sensor or module (e.g., render the integrated model according to one of GNSS data, visual image data, thermal image data, radar data, or sonar data). Also, the controller may, if the first position and second position are determined to substantially match (e.g., if terrain features are within, for example, +/−25 feet of their positions measured using the different sensors) the controller may indicate that the first position and the second position are matching. In other embodiments, controller 130 may compare data of other sensors related to other aspects of the database and/or the integrated model and determine any matches or mismatches within the data of navigational database 222a. The matches and/or mismatches may be directed to any aspect of navigational database 222a or integrated model 222b. For example, matches and/or mismatches between terrain features, wildlife (e.g., flora and/or fauna), mobile structure position, environmental conditions, and/or other aspects of data within navigational database 222a may be highlighted. The matches and/or mismatches may then be highlighted within display 226, such as through renderings within the integrated model.

Additionally, in another embodiment, the position of mobile structure 101 may first be determined, and, using radar, sonar, image, and/or other data, positions of other vehicles and/or landmarks may be determined. Thus, in such embodiments, the position of mobile structure 101 may first be determined. Then, the various sensors on mobile structure 101 may receive data associated with the position of the other vehicles, or data may be sent to mobile structure 101 from the other vehicles or third-party data related to such may be sent to mobile structure 101. For example, the visible and/or infrared imaging module 223 and/or 224 may, through image data, determine a distance of the vehicle from mobile structure 101. Another module and/or the OPS may then determine the direction that the visible and/or infrared imaging module 223 and/or 224 is pointed towards and, accordingly, determine where, in relation to mobile structure 101, the vehicle is located. Thus, the position of the other vehicle may then be determined.

As shown, system 220 may include one or more controllers 221 (e.g., including memory 222), imaging modules (e.g., visible spectrum imaging module 223 and/or infrared imaging module 224), other sensors (e.g., orientation and/or position sensor 225), display 226, communication module 227, and/or other modules 228 facilitating operation of system 220, which may or may not all be disposed within a common housing 240. In certain embodiments, system 220 may be a portable device or may be integrated within a mobile structure. In other embodiments, the components of system 220 may be distributed over a combination of one or more portable devices, mobile structure 101, and/or external devices, structures, and vehicles. In certain embodiments, one or more of the modules shown in FIG. 2 may be integrated with a stationary user interface and/or mount (e.g., coupled to deck 106b or mast/sensor mount 108b of mobile structure 101 in FIG. 1B) and be configured to communicate with devices within housing 240 through a distributed embodiment of communication module 227.

Visible spectrum imaging module 223 and infrared imaging module 224 may be electronic devices configured to capture imagery/image data of scene 200 according to their respective spectrums and provide images/image data to controller 221 and/or memory 222. In some embodiments, visible spectrum imaging module 223 and infrared imaging module 224 may be implemented according to any similar devices described in U.S. patent application Ser. No. 14/138,058, filed Dec. 21, 2013, and entitled "COMPACT MULTI-SPECTRUM IMAGING WITH FUSION", which is hereby incorporated by reference in its entirety. Moreover, imagery provided by imaging modules 223 and 224 may be combined (e.g., blended, overlaid, fused, or otherwise combined) to provide combined (e.g., from multiple source spectrums) imagery/image data that may be rendered by system 220 and/or displayed using display 226 using any of the methods described in U.S. patent application Ser. No. 14/138,058 (incorporated by reference above) and/or as further described herein.

More generally, system 220 may include a variety of imaging modules adapted to capture imagery (e.g., image and/or video data) according to visible spectrum, infrared, and other spectrums, for example, and provide corresponding image data to controller 221 or other controllers or devices for rendering and/or display. In some embodiments, imaging modules 223 and/or 224 may be mounted to a mobile structure separate from system 220 (e.g., to deck 106b or mast/sensor mount 108b of mobile structure 101 in FIG. 1B, using a fixed or actuated mount such as imager cluster 161) and be configured to provide imagery to controller 221 using wired and/or wireless communications through communication module 227. In such embodiments, multiple devices may be configured to share image data provided by imaging modules mounted to mobile structure 101.

Controller 221 and/or memory 222 may each be implemented as any appropriate logic device (e.g., processing device, microcontroller, processor, application specific integrated circuit (ASIC), field programmable gate array (FPGA), memory storage device, memory reader, or other device or combinations of devices) that may be adapted to execute, store, and/or receive appropriate instructions, such as software instructions implementing a control loop for controlling various operations of mobile structure 101, for example, similar to controller 130. In certain embodiments, controller 221 of system 220 may be integrated or may be the same as controller 130 and, thus, may be integrated within mobile structure 101. In other embodiments, system 220 or part of system 220 may be separate from mobile structure 101 and, accordingly, controller 221 and controller 130 may be separate. In such embodiments, controller 221 and controller 130 may be communicatively coupled through, for example, WiFi, Bluetooth, direct data links, NFC, and other appropriate communication data methods. In some embodiments, controller 221 may be in communication with various modules of system 220 and be configured to receive imagery/image data of scene 200 from imaging modules 223 and/or 224, determine waterline 205 of a body of water 205a in scene 200 (e.g., from image data, position data, and/or orientation data provided by the device), render or display image data in any portion of an FOV of display 226 that extends above waterline 205, and/or render and/or display sonar data in any portion of the FOV of display 226 that extends below waterline 205. In certain embodiments, memory 222 may include data such as, for example, navigational database 222a and/or integrated model 222b.

In the embodiment shown in FIG. 2, system 220 includes OPS 225. In some embodiments, controller 221 may be configured to receive the sonar data, the radar data, and/or image data based on a measured position and/or orientation provided by OPS 225. OPS 225 may be implemented as one or more orientation sensors, GNSS sensors, differential GNSS sensors, orientation/position reference transducers and/or optical sensors (e.g., for actuators), visible spectrum and/or infrared imaging modules, and/or other sensors configured to measure a relative and/or absolute orientation and/or position of system 220 and/or each of imaging modules 223 and 224 and display 226 and provide such measurements to controller 221. For example, in one embodiment, OPS 225 may include one or more remote infrared imaging modules (e.g., implemented similar to infrared imaging module 224) fixed to a mobile structure and a number of infrared registration marks disposed on housing 240, and controller 221 may be configured to determine a relative position and/or orientation of system 220 from the size and/or position of the infrared registration marks and/or other related characteristics of system 220 in image data captured by the one or more remote infrared imaging modules. Such relative position and/or orientation may be relative to a position and/or orientation of the remote infrared imaging modules and/or mobile structure 101.

In some embodiments, OPS 225 may be distributed amongst the various modules of system 220 and include one or more individual module OPSs configured to measure orientations and/or positions of image modules 223 and/or 224, radar 229, other ranging sensors, and/or a separate display OPS configured to measure a position and/or orientation of display 226. In various embodiments, controller 221 may be configured to combine image data and sonar data according to OPS measurements and/or measurements of an orientation and/or position of a coupled sonar system (e.g., from a corresponding OPS) and/or mobile structure to produce combined imagery, such as visible spectrum images of scene 200 above waterline 205 and/or three-dimensional sonar images of scene 200 below waterline 205. In other embodiments, controller 221 may be configured to use orientation and/or position measurements of system 220, imaging modules 223 and 224, radar 229, display 226, other ranging sensors, and/or mobile structure 101 to control one or more actuators to adjust a position and/or orientation of imaging modules 223 and 224 and/or portions of an associated sonar system (e.g., transducer assembly 112) to image or ensonify a particular position and/or orientation of scene 200 relative to an FOV of display 226. In various embodiments, controller 221 and memory 222 may be integrated together, for example, or may be implemented in a distributed manner across a number of individual controllers and/or memories.

Display 226 may be implemented as one or more LCDs, OLEDs, touch screen displays, projection devices, and/or other digital displays that may be configured to display image data from imaging modules 223 and 224, sonar data (e.g., from sonar system 110 of FIGS. 1A and 1B), radar data, integrated model 222b rendered by controller 221, and/or other image data, to user 290. In various embodiments, display 226 may be characterized by an FOV that is a function of the available pixel dimensions of display 226, the position and/or orientation of display 226, the FOVs of imaging modules 223 and/or 224, an effective optical zoom level applied to the image data provided by imaging modules 223 and/or 224, and/or similar characteristics of other navigational and/or ranging sensors. For example, where imaging modules 223 and 224 are within the same housing 240 as display 226, the position and orientation of display 226 may be substantially the same as that of imaging modules 223 and/or 224, and the FOV of display 226 may be the same as that for imaging modules 223 and/or 224 as modified by the effective zoom level and the pixel dimensions of display 226. In other embodiments, where imaging modules 223 and/or 224 are mounted outside of housing 240, the FOV of display 226 may be dependent on the absolute or relative position and/or orientation of display 226 as compared to that of imaging modules 223 and/or 224.

In some embodiments, the effective optical zoom level may be adjusted to produce an FOV for display 226 that substantially reproduces a direct view of scene 200 as experienced by user 290, for example, so that objects within scene 200 are approximately the same size when viewed by user 290 with or without use of system 220. In such embodiments, the effective optical zoom level may be adjusted by sensing a distance between user 290 and display 226 and then selecting the effective optical zoom level based on that distance to reproduce the direct view of scene 200. In other embodiments, the effective optical zoom level may be adjusted by user input to reproduce the direct view and/or to select a higher or lower effective optical zoom level to increase or decrease the FOV of and/or the image detail produced by display 226. The effective optical zoom level may be adjusted using digital image processing techniques, manual and/or actuated adjustment of optical components within imaging modules 223 and/or 224, or any combination of image processing or optical adjustments.

Communication module 227 may be implemented as any wired and/or wireless interface configured to communication sensor data, configuration data, parameters, and/or other data and/or signals between system 220 and other elements of mobile structure 101 (e.g., as shown in FIGS. 1A and 1B) and/or amongst modules of system 220. As described herein, in some embodiments, communication module 227 may be implemented in a distributed manner such that portions of communication module 227 are implemented within one or more modules of system 220 that may or may not be disposed within housing 240.

Other modules 228 may include other and/or additional sensors, sensor arrays, actuators, logic devices, communications modules/nodes, power and/or power distribution components, and/or user interface devices used to provide additional environmental information and/or configuration parameters, for example, and/or to adjust a position and/or orientation of system 220. In some embodiments, other modules 228 may include various environmental sensors providing measurements and/or other sensor signals that can be displayed to a user and/or used by other devices of system 220 (e.g., controller 221) to facilitate operation of system 220. Such environmental sensors may include sensors configured to determine cloud, wind, precipitation, or wind conditions of an environment around mobile structure 101. In some embodiments, other modules 228 may include one or more buttons and/or other user input devices configured to accept manual user input. In other embodiments, other modules may include one or more distance and/or user presence detectors configured to detect user 290 and/or measure or estimate a distance between display 226 and user 290.

In various embodiments, system 220 may be implemented in a single housing 240 with a single display (e.g., display 226) adapted to be held by user 290 while user 290 views the display. In other embodiments, housing 240 may be mounted to a mobile structure using a fixed or actuated mount to provide a fixed or actuated view relative to an orientation of mobile structure 101. In some embodiments, system 220 may be implemented as a wearable device, such as a pair of glasses including a plurality of displays configured to provide the same image to each eye of user 290 individually or to provide stereoscopic imagery to both eyes of user 290. Such stereoscopic imagery may be generated using multiple instances of imaging modules 223 and/or 224, for example, or by applying various image processing techniques to image and/or sonar data to provide a simulation of depth.

Figure 3:
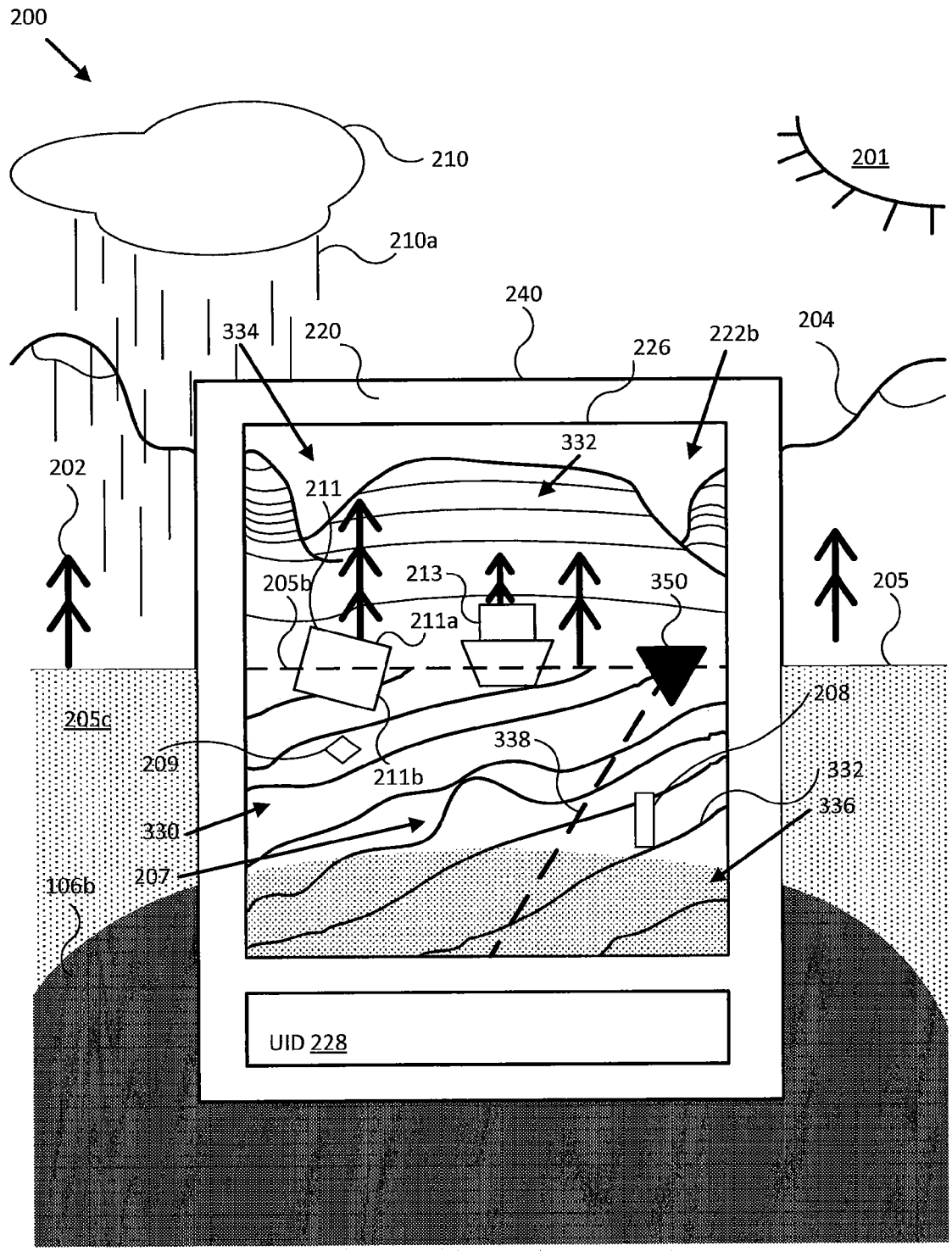
FIG. 3 illustrates a diagram of a display of a navigation system in accordance with an embodiment of the disclosure.

FIG. 3 illustrates a diagram of a display of a navigation system in accordance with an embodiment of the disclosure. In the embodiment shown in FIG. 3, system 220 is oriented to illustrate imagery as integrated model 222b that is displayed by display 226 as viewed by user 290 of FIG. 2, where the effective optical zoom level is adjusted to reproduce a direct view of scene 200 (except for a relatively small portion of the direct view obscured by housing 240 and/or user input device 228. In some embodiments, system 220 may be configured to provide augmented reality imagery (e.g., an implementation of integrated model 222b), similar to that generated with respect to portable imaging device 420 in FIG. 4.

Scene 200 includes features above waterline 205 illustrated in FIG. 2 and additionally includes mountains/land features 204, tree 202, vehicle 213, floating object 211a, surface 205c of body of water 205a, and deck 106b (e.g., of mobile structure/boat 101 in FIG. 1B). Also shown in FIG. 3, and in particular in the FOV of display 226, are detected waterline 205b, portion 330 of the FOV that extends below waterline 205b, and portion 334 of the FOV that extends above waterline 205b. System 220 may in some embodiments be configured to render detected waterline 205b in display 226 to illustrate a detected location of waterline 205 relative to the FOV of display 226. Portion 330 may include imagery representing bottom feature 207, fish 208, submerged object 209, and the submerged portion of the floating object 211b similar to objects illustrated in FIG. 2. For example, as shown in FIG. 3, portion 330 may include a number of contour lines 332 rendered by a controller (e.g., controller 221 of FIG. 2) to distinguish depths, relative distances, various characteristics of bathymetric data, and/or other characteristics of underwater features. In some embodiments, contour lines 332 may be rendered in portion 334 above the waterline. Contour lines 332 above waterline 205 may distinguish elevation, relative distances, and various other characteristics of terrestrial features.

Alternatively, or additionally, portion 330 may include icons and/or other types of graphical indicators configured to illustrate a position and/or distance to fish 208, submerged object 209, floating object 211b and/or to distinguish between the various objects (e.g., based on fish detection processing performed on acoustic returns from fish 208, submerged object 209, and/or floating object 211b). For example, icon 350 may be rendered to show a planned destination for mobile structure 101. The planned destination may be a destination inputted into the controller by a user. Additionally, suggested route 338 may also be rendered. Suggested route 338 may be a route determined by the controller to best guide the operator (who may or may not be the user) of mobile structure 101 to the planned destination indicated by the icon 350.

In certain embodiments, the controller may use data from one or more sensors to offer an enhanced view. For example, in FIG. 3, rain 210a may be present. However, display 226 may combine information from a plurality of sensors and render the scene 200 in display 226 without the presence of rain 210a. In certain embodiments, the controller may be able to "see through" the rain by, for example, using radar data or image data and determining the presence of rain and so removing the rain from the image. In certain such embodiments, the controller may distinguish between rain or other weather (such as fog, win, etc.) that may not have an effect on navigation and rain or other weather that may have an effect on navigation. For example, the controller may, from sensors that may detect wind speed, third party weather data, or weather data from other vessels and installations, determine whether rain and/or other weather data is representative of a storm (e.g., a hurricane) or other bad weather condition. In such cases, the controller may then render the weather, graphics indicative of the weather, or a warning on display 226 to warn the user of the weather. In other embodiments, the controller may render the weather, graphics indicative of the weather, or messages to indicate the weather even if the weather data does not indicate that the weather conditions are representative of that of a storm or other bad weather.

In certain embodiments, the controller may additionally be configured to forecast future weather conditions around mobile structure 101 from the weather data and/or other data. For example, the controller may use the weather data from the sensors as well as data indicating weather conditions around mobile structure 101 to forecast future weather conditions. In such an embodiment, data indicating wind speed, the position of the sun, the location of mobile structure 101, the positioning of the clouds, the barometric pressure, current and historical precipitation, and other environmental factors may all be considered in forecasting future weather conditions.

Although the FOV of display 226 in FIG. 3 is shown to include both portions 330 and 334, a different position and/or orientation of display 226 and/or system 220 could result in portion 330 or 334 encompassing the entire FOV of display 226. In certain embodiments, portions 330 and 334 may be rendered in different manners (e.g., with 3D graphics for the portion 334 and with contour lines for the portion 330) and/or rendered with data from different sensors or from a combination of sensors. In other embodiments, portions 330 and 334 may be rendered in the same manner (e.g., with contour lines for both portions) and/or rendered with data from the same sensors.

In some embodiments, age or source of sonar data may be differentiated by rendering substantially real time sonar data differently from prior-acquired and/or survey map sonar data (e.g., a 3rd party provided chart or collection of bathymetric data for a particular body of water stored in memory, such as memory 222 of FIG. 2). For example, substantially real time sonar data may be rendered in color and prior-acquired and/or survey map sonar data may be rendered in greyscale. In some embodiments, a relative age of once real time sonar data may be indicated by reducing a chrominance level of the sonar data as the sonar data ages. In additional embodiments, system 220 (e.g., controller 221 of FIG. 2) may be configured to detect or determine various surfaces of underwater features based on acoustic returns from the surfaces and/or one or more volumetric renderings of corresponding sonar data, and the relative or absolute orientations of the various surfaces may be determined from the volumetric renderings. In such embodiments, system 220 may be configured to indicate the relative or absolute surface orientations in portion 330 by mapping the surface orientations to a color and/or intensity map and rendering the sonar data corresponding to the determined surfaces in a corresponding color. In addition, 3rd party provided charts and/or bathymetric data may be updated with sonar data and/or any other data received by the controller 130. As charts may contain errors, using the sonar data to update the charts may allow for such errors to be corrected.

Also shown in portion 330 of the FOV of display 226 is overlapping portion 336, which indicates where deck 106b would otherwise obscure direct view of surface 205c. In some embodiments, system 220 may be configured to determine whether portion 330 overlaps with a view of a mobile structure disposed on surface 205c (e.g., mobile structure 101 of FIG. 1A or 1B), thereby forming overlapping portion 336. If overlapping portion 336 exists, system 220 may be configured to blend image data of mobile structure 101 (e.g., captured by imaging modules 223 and/or 224) with sonar data in overlapping portion 336 and rendering the blended data in the overlapping portion 336. In embodiments where system 220 is worn by a user and generally occludes direct view of the user's surroundings, the blended imagery can provide a user with a view of sonar data beneath mobile structure 101 but protect the user from stumbling into objects on mobile structure 101 and/or walking off deck 106b.

Display 226 may also show vehicle 213 and/or floating object 211. In certain embodiments of display 226, the controller may recognize that vehicle 213 and/or floating object 211, as well as other objects, overlaps portion 334 above waterline 205 and portion 330 below waterline 205. In certain such embodiments, the controller may render vehicle 213 and/or floating object 211 as one object (by fusing data from multiple sensors) and/or render the vehicle 213 and/or the floating object 211 using data from a single sensor instead of rendering the above water and underwater portions of the vehicle 213 and/or the floating object 211 in different manners and/or using different data from different sensors to determine the above water and underwater portions of the respective objects. In certain other embodiments, the vehicle 213 and/or the floating object 211 may be rendered in different degrees of transparency so that terrain features behind the vehicle 213 and/or the floating object 211 (such as the tree behind the objects in FIG. 3) may be viewable by the user. In certain such embodiments, the user may select the level of transparency of the vehicle 213 and/or the floating object 211 rendered within display 226.

Figure 4:
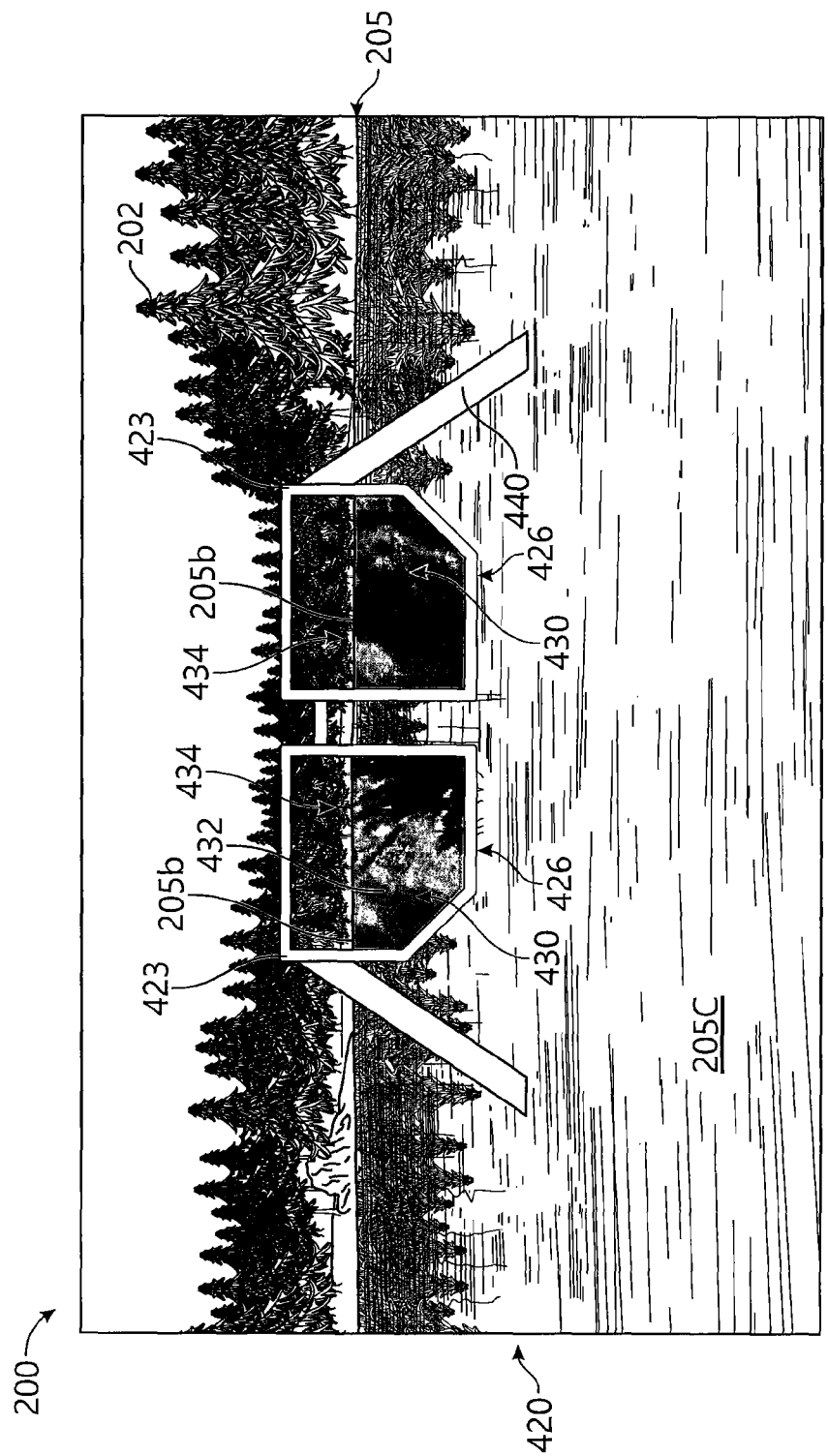
FIG. 4 illustrates a diagram of an augmented reality navigation system in accordance with an embodiment of the disclosure.

FIG. 4 illustrates a diagram of an augmented reality navigation system in accordance with an embodiment of the disclosure. In various embodiments, portable imaging device 420 may be implemented with similar functionality as that described with reference to system 220 in FIGS. 2 and 3. In the embodiment shown in FIG. 4, wearable portable imaging device 420 is oriented to illustrate imagery displayed by displays 426 (e.g., one per user eye) as viewed by a user wearing portable imaging device 420, where the effective optical zoom level is adjusted to reproduce a direct view of scene 200 (except for a relatively small portion of the direct view obscured by imaging modules 423 and/or frame 440).

FIG. 4 includes some of the features above waterline 205 illustrated in scene 200 of FIGS. 2 and 3, and, in particular in the FOV of displays 426, includes detected waterlines 205b, portions 430 of the FOV that extend below respective waterlines 205b, and portions 434 of the FOV that extend above respective waterlines 205b. Portions 430 may include color and/or intensity shading 432 rendered by a controller (e.g., controller 221 of FIG. 2) to distinguish depths, relative distances, various characteristics of bathymetric data, and/or other characteristics of various underwater features.

As illustrated in FIG. 4, wearable portable imaging device 420 may include one or more imaging modules 423, which may be implemented as visible spectrum and/or infrared imaging modules configured to provide monocular (e.g., copied to both displays 426) and/or stereoscopic image data depending on the number and arrangement of imaging modules and the type of image processing applied to image data provided by imaging modules 423. In addition, an OPS (e.g., OPS 225 of FIG. 2) may be integrated with any of imaging modules 423, displays 426, and/or frame 440 and be configured to provide a position and/or orientation of one or more of the features to facilitate determining FOVs for displays 426. In some embodiments, portable imaging device 420 may be configured to determine portion 430 of the FOV of display 426 and use an OPS and actuator in an associated transducer assembly (e.g., actuator 116 coupled to transducer assembly 112 of sonar system 110 in FIG. 1B) to ensonify at least a subset of portion 430 substantially in real time as a user adjusts a position or orientation of wearable portable imaging device 420 by, for example, moving the user's head. Sonar data provided by the associated transducer assembly may be rendered using position data and/or orientation data provided by the OPS to correlate the sonar data with portion 430, for example, and/or to facilitate other rendering processing described herein.

In some embodiments, displays 426 may be implemented with substantially transparent display panels, where the only portions of displays 426 that obscure a direct view of scene 200, as seen by a user wearing portable imaging device 420, are those portions actively displaying rendered image data. In such embodiments, portable imaging device 420 may be configured to render and display portions 430 and/or detected waterlines 205b using displays 426 without also rendering portions 434. Power for portable imaging device 420 may be embedded within frame 440 and/or electrically coupled to portable imaging device 420 through use of a wire harness and/or an external power source, such as a battery pack or a power source for a mobile structure.

In various embodiments, navigation system 100 may be configured to generate navigation display views including a prospective threat timeline identifying any navigational hazards threatening navigation of mobile structure 101 as mobile structure 101 navigates according to a planned route or selected course. For example, navigation system 100 may be configured to assist in navigating mobile structure 101 in an area including multiple and different types of navigational hazards, where a list of "TCPAs" or times to closest point of approach in a label attached to each navigational hazard would typically make it difficult for a pilot to intuit which is the most immediate threat—the pilot would be required compare numeric data in a potentially large number of boxes filling a display of user interface 120. Embodiments of navigation system 100 may be configured to generate a virtual model of the navigable area about mobile structure 101 (e.g., an integrated model, as described herein)) and render a view of the virtual model including graphical representations of at least the present-time navigational hazards about mobile structure 101, as detected by various navigation sensors integrated with navigation system 100, and various navigation threat indicators configured to indicate relative positions and/or extents of navigational exclusion zones corresponding to the identified navigational hazards that intersect a planned route or selected course of mobile structure 101, as described herein.

In some embodiments, system 100 may be configured to use such virtual model, along with other navigational data, to determine prospective relative positions and/or extents of such navigational exclusion zones according to a range of future times/prospective threat evolution durations and up to a maximum prospective threat evolution duration (e.g., relative to the present time). As such, system 100 may be configured to generate a navigation display view including the virtual model view and a threat timeline selector (e.g., rendered as a graphical overlay over the virtual model) configured to allow a user to select a prospective threat evolution duration and/or scan from the present time up through a maximum prospective time duration (e.g., typically 20, 30, 40, 50, or 60 minutes or longer, depending on environmental and/or operational characteristics associated with mobile structure 101, as described herein). In particular embodiments, such navigation display view may include a camera view (e.g., using image data provided by imaging modules of system 220) of the navigable area about mobile structure 101, which may be aligned with the perspective of the virtual model rendered within the navigation display view. In various embodiments, the virtual model may be used to generate a two or three-dimensional view of the navigational status of mobile structure 101, for example, and may include a variety of navigational data, including waypoint arrival times, determined TCPAs of navigational hazards, and/or other navigational data, as described herein. In particular embodiments, such virtual model may include and/or be used to generate a 2D chart or a radar chart (e.g., a rendering of radar data indicating at least relative bearings and/or ranges to detected navigational hazards).

In some embodiments, the virtual model may be configured to generate a relatively decluttered view of the navigational situation around mobile structure 101 by, for example, grouping navigational hazards by probability of intersection with mobile structure 101 and applying one of three or four colors (e.g., a simplified color palette) to critical red), cautionary (orange), and informational (yellow) navigational hazards. Navigational hazards may be displayed with their true COGs displayed, predicted areas of danger, and/or key data. In some embodiments, the threat timeline selector may be configured to indicate the approximate prospective time a particular navigational hazard will be encountered, such as closest point of approaches by nearby navigational hazards, times of waypoint arrivals, times of entering dangerous shallows, times of approaching static targets such as buoys, and/or other navigation events.

In various embodiments, system 100 may be configured to determine relative positions and/or extents of navigational exclusion zones based, at least in part, on the assumption that mobile structure 101 will either continue on an existing COG/heading or continue on a planned route/set of waypoints. A pilot may scrub the threat timeline selector from a default NOW position into the future, which will update the virtual model based on best assumptions of navigational hazard future positions based on their current behaviors, in order to see a possible future scenario. Dangerous navigational hazards may be highlighted in a rendering of virtual model and correlated in a corresponding camera view, as described herein (e.g., selecting/highlighting a vessel in one view highlights the same vessel in the other view). A pilot may pan (rotate) the camera view and the virtual model rendering in unison, e.g. swiping the camera view to the left will rotate the virtual model, as rendered in the navigation display view, to face the same direction/bearing relative to mobile structure 101.

In related embodiments, once navigational hazards are identified, navigation system 100 may be configured to group proximity/hazard approach warning alarms into presets, thereby allowing multiple activation/deactivation value settings with minimal user input or automatically. Embodiments may be configured to generate bathymetry-based alarms while simplifying a pilot's chart view (e.g., using decluttering as indicated herein). As such, embodiments address the problem of false alarms (e.g., too many alarms being set off too often causes users to turn off the system) and may be configured to advise pilots of best-course-of-action and/or create autopilot course changes automatically. For example, mobile structure 101 may be protected by an increasing number of alarms, based on multiple navigation sensors and processing of corresponding navigational data, such as: convolutional neural network (CNN) processing techniques integrated into system 220 can generate warnings for previously undetectable objects (fishing floats, personal water craft); by combining bathymetry (from sonar system 110) with tide height proximate mobile structure 101 and keel depth of mobile structure 101 (all types of navigational data), it is possible to determine risk of grounding based on looking ahead on a chart or other embodiments of the virtual model described herein. However, the more alarms applied to any particular navigation situation, the less likely a pilot is to activate any of them (paradox of choice). Embodiments of navigation system 100 may be configured to warn pilots before they make an error, provide suggested course of action, and/or modify an autopilot target heading, wind angle, or route, for example, without subjecting the pilot to a barrage of alarms.

Examples of individual safety alarms: AIS-based dangerous target alarm based on time to reach a configurable range threshold; radar-based dangerous target alarm based on time to reach a configurable range threshold; radar guard zone based on detection of radar returns within configurable zone(s); predicted area of danger based on comparison of own vessel and AIS target vessel paths; depth alarms based on sonar; depth alarms based on charted depths; object proximity alarms based on charted objects. Each of these would normally be enabled/disabled and have different values set depending on different maneuvering scenarios or statuses: close quarter maneuvering in harbors; pilotage in restricted waterways; open water navigation; and oceanic navigation. Embodiments of navigation system 100 may be configured to simplify operation of such alarms by: allowing a pilot to configure (or have default configurations for) each of these scenarios, plus custom scenarios; providing a number of one-press activation selectors of these presets to activate the configured grouping of alarm settings as a pilot enters one of these scenarios; automatically changing between alarm presets based on the system detecting location (e.g., inferred entrance into any one of the scenarios, based on corresponding navigational data). In some embodiments, navigation system 100 may be configured to apply collision regulations to navigational hazards of known types (AIS) and thereby propose regulatory-appropriate courses of action to the pilot and/or predict likely courses of action of such navigational hazards (e.g., power boat gives way to sailboat, oncoming vessels turn to right, etc.).

Navigation requires continual mental math since tide heights and keel depths need adding to chart datum in order to determine safe/unsafe water. Charts can be complex and cluttered due to depth sounding numbers and contours with different color shades. During planning this may be hard to avoid since the pilot will have to contend with different tide heights at different times. However, during piloting, when decisions need to be made quickly, and pilots may be inexperienced or chartering a new vessel in new waters, there is an urgent need to simplify the view. Furthermore, as augmented reality or AIS collision warnings are added, there is an increase in the risk of overloading the view with clutter if it isn't simplified. In addition, many accidents arise due to inattention. Embodiments of navigation system 100 may be configured to monitor a virtual model (e.g., a chart) and any connected sensors (AIS, radar, camera CNN or machine vision analysis/application (MVA) outputs etc.) and provide a single warning ahead of time if a dangerous situation starts to arise. The dangerous situations may also be marked in a consistent way within the virtual model as rendered in a navigation display view so that alerts make immediate and intuitive sense to the pilot.

In various embodiments, navigation alarms can be implemented with or without CNN, and the following can be implemented independently of each other, or in phases: to detect and alert as dangerous situations arise; to advise on the best course of action; to turn mobile structure 101 automatically (autopilot interaction). A classic chart may suffer from the following undesirable characteristics: depths referenced to chart datum, pilot needs to add tide height and subtract keel depth; depth contours are hard to read (numbers are small) and pilot must interpolate; busy chart+AIS collision zones=clutter=potential confusion; no direct correlation of danger regions which may produce collisions. Embodiments of navigation system 100 may be configured to combat these disadvantages by generating a simplified and decluttered view, integrated with the alarm system, so it's apparent that navigational exclusion zones are the cause of alarms; depths already have tide height and keel depth added, plus safety clearance which is boat speed and sea state dependent; simplified palette where, for example, green is currently visible inter-tidal zone (mud), yellow is land, white is safe, orange is no-go, collision zones are clarified according to the simplified palette, and shallows ahead are marked as a navigational exclusion zone.

In various embodiments, the virtual model of navigational data may be projected into 3d view using a projection transform configured to present a perspective view above and behind or disposed within mobile structure 101, for example. Such 3d view may include icons for navigational hazards corresponding to vessels/buoys, warning markups/text, and/or other graphical indicators and/or selectors. A navigation display view incorporating a rendering of the virtual model may include a camera view, as described herein.

Embodiments of navigation system 100 may be configured to help reduce average power consumption, since displays can be maintained in standby and energized automatically if a dangerous situation is developing. AIS navigational hazards may be represented by icons and corresponding navigational exclusion zones indicating potential collisions and assisting in collision avoidance. Charted obstructions may be represented by similar object alerts, so that the setup/alarms are common with collision avoidance techniques for AIS navigational hazards. Embodiments may include graphical indicators configured to clearly convey why certain zones create un-navigable space—such as drawing a limit line (dependent on keel draft, safety margin, tide height interpolated from nearest tidal diamonds, and charted object depth). Mini-automatic radar plotting aid (MARPA) navigational hazards may create additional inputs to the collision avoidance techniques, and all radar returns could be integrated into the collision avoidance methodology. MVA output may create additional collision avoidance technique inputs, and CNN may also be used.

As noted herein, there is a danger that too many false alarms cause pilots to turn off the system. In some embodiments, navigation system 100 may be configured to reduce alarm rates according to a specified maneuvering scenario, such as a close quarter or harbor maneuvering scenario, and the switch over to each maneuvering scenario can be automatic based on, for example, a position of mobile structure 101 and chart information indicating mobile structure 101 has entered a throughway into a harbor. In other embodiments, navigation system 100 may be configured to generate two levels of warning, the first to highlight navigational hazards visually, the second to sound an alarm audibly. For sailboats where backlight power consumption is a major problem, visual highlighting may involve bringing a user interface/display out of sleep mode. In another embodiment, navigation system 100 may be configured to set intercept zones dynamically and dependent on object class, such as fishing float: 2 m; floating navigation mark: 5 m; fixed navigation mark: 20 m; vessel: 30 m+vessel size+10×relative speed in kts; harbor walls: 3×boat speed in kts; rocks in open water: 100 m; rocks in harbor: 20 m; buoy: 10 m. In further embodiments, navigation system 100 may be configured to delay an alarm until a dangerous situation persists for a preselected amount of time. In related embodiments, navigation system 100 may be configured to minimize the impact of false alarms by detecting that a pilot has cancelled an alarm with respect to a particular navigational hazard and cancelling all related alarms from all sources (e.g., if the same navigational hazard is picked up on the chart, radar, and camera, it should not need cancelling three times), for example, and where cancelling on one display view cancels the alarm on all displays.

In some embodiments, navigation system 100 may be configured to determine a safe navigation depth zone or zones corresponding to mobile structure 101. For example, safe depth depends on tide height, keel depth, wave height, and the desired safety margin, which may itself be a function of vessel speed. Tide height may be based, at least in part, on interpolated tide heights from nearby tidal diamonds, atmospheric pressure, a safety margin for local effects like wind, and/or the projected time to reach an area/waypoint.

In various embodiments, navigation system 100 may be configured to operate with relatively simple user input (e.g., "just select how many minutes warning you need, and system 100 generates a corresponding virtual model automatically). Navigation system 100 generally generates more reliable virtual models the more navigation sensors it incorporates, but embodiments are able to provide sufficiently reliable navigation assistance with a minimal system, i.e. just a chart of the area. In particular embodiments, navigation system 100 may be configured to provide expert guidance and auto routing around detected navigational hazards, such as according to various collision regulations (COL-REGS): if a stand-on sailboat were to try to change course to avoid a give-way power boat then this action could cause a great deal of confusion and possibly a collision, and so it's critical that the stand-on vessel does indeed stand-on; if the power boat decides to turn to the left, then there will be confusion and possibly a collision, and so it's vital to follow the COLREG and turn to the right. As such, navigation system 100 may be configured to use such ruleset to mark navigational exclusion zones around a vessel, then integrate these exclusion zones with others (e.g. north side of a southerly cardinal mark, shallow zone etc.) so that a decluttered view contains all exclusion zones including those which would fall foul of the COLREGS, all rendered according to a simplified palette. It is then possible to apply auto routing in continuous time, to achieve expert guidance and autopilot self-driving.

Figure 5:
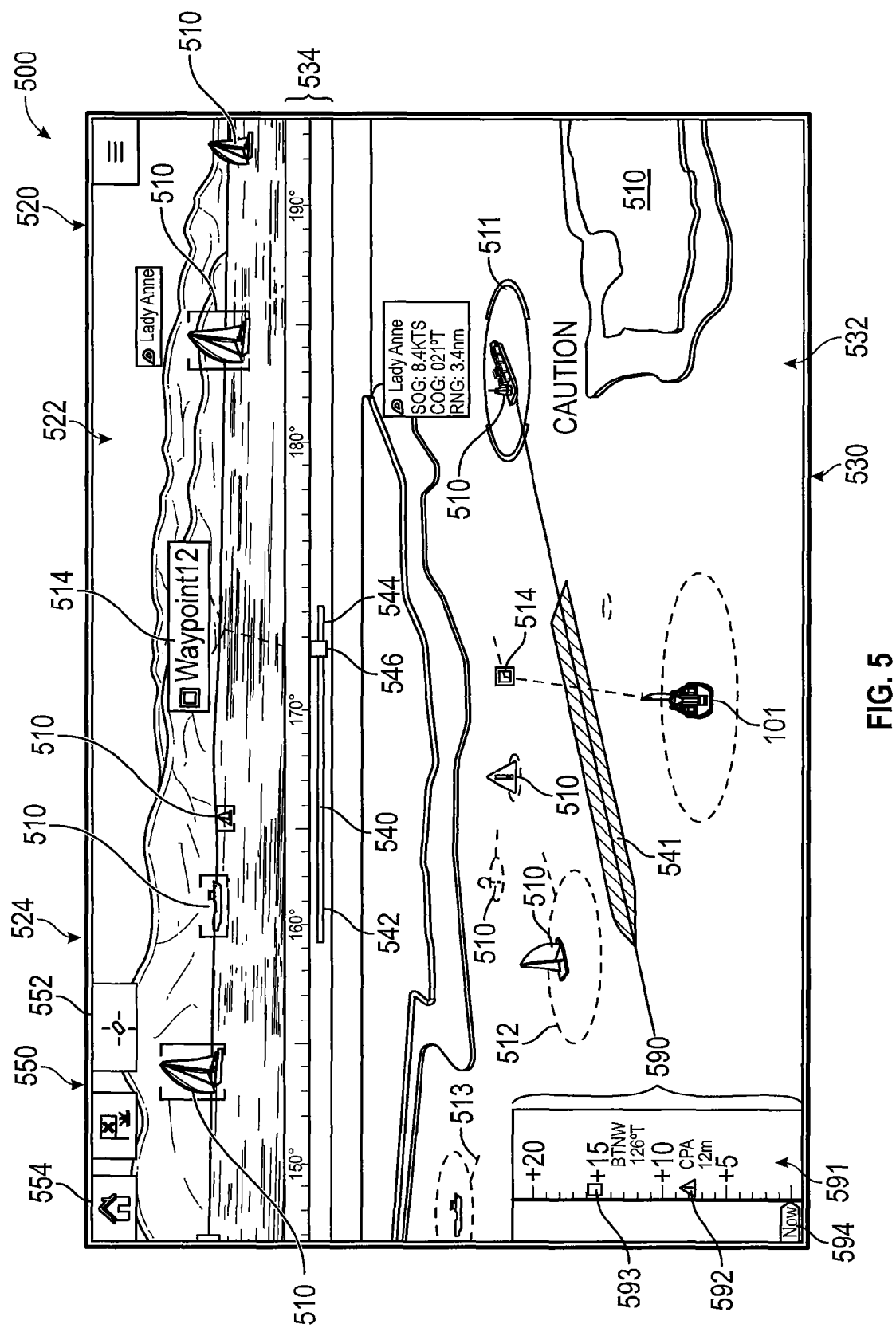
FIG. 5 illustrates a diagram of a navigation display view that may be rendered within a display of a user interface for a navigation system in accordance with an embodiment of the disclosure.

FIG. 5 illustrates a diagram of a navigation display view 500 that may be rendered within a display (e.g., display 226, displays 426) of user interface 120 in accordance with an embodiment of the disclosure. As shown in FIG. 5, navigation display view 500 may be configured to allow a pilot to visualize and interact with (e.g., view, group, associate, search, and/or modify) navigational data produced by various navigation sensors. For example, navigation display view 500 may allow a pilot to visualize and interact with one or more present or future navigational hazards 510 and/or associated navigation exclusion zones 540 relative to mobile structure 101. More specifically, navigation display view 500 may allow a pilot to visualize current and projected positions of one or more navigational hazards 510 in order to assist the pilot in navigating a particular area, such as in a congested area of multiple navigational hazards 510 (e.g., sailboats, cargo ships, motorboats, buoys, shallows, land, etc.). In this manner, mobile structure 101 may be maneuvered proactively, such as by the pilot, to anticipate or limit risk of future navigation risks (e.g., collisions, beaching, capsizing, etc.) within a navigational area to effectively navigate around or through multiple navigational hazards having various positions, headings, and speeds, as explained herein. As described herein, a navigational hazard or danger refers to any structure, landmark, geophysical condition, vessel, vehicle, and/or other navigational hazard that may pose a threat to the physical integrity or condition of mobile structure 101 if encountered.

In some embodiments, navigation display view 500 may allow a user to manage one or more functions of a navigation system, such as system 100 of FIG. 1, system 220 of FIGS. 2 and/or 3, and/or system 420 of FIG. 4. For example, navigation display view 500 may allow a user to adjust or modify one, some, or all of the elements of systems 100, 220, and/or 420 according to a desired operation of such navigation systems and/or mobile structure 101. Depending on the application, navigation display view 500 may be implemented as a graphical user interface (GUI) rendered via a display (e.g., display 226 and/or 426) of user interface 120.

As shown in FIG. 5, navigation display view 500 may include one or more dialog windows, panels, or regions allowing a pilot to view information and control various functions of navigation system 100. Such functions may include, but are not limited to, viewing, selecting, highlighting, modifying, grouping, and/or searching navigational hazards, among others. In one or more embodiments, navigation display view 500 may include one or more of a camera view region 520 and/or a virtual model region 530. Although FIG. 5 illustrates navigation display view 500 including camera view region 520 and virtual model region 530, in one or more embodiments, one of camera view region 520 and virtual model region 530 may be omitted from navigation display view 500. For instance, navigation display view 500 may include only virtual model region 530 or only camera view region 520.

Camera view region 520 may include a camera view 522 of the scene surrounding mobile structure 101. For instance, one or more imaging modules coupled to and/or associated with mobile structure 101 may be configured to capture image data of the scene around mobile structure 101 and provide it to controller 130 of system 100. Controller 130 may be configured to render the image data as camera view 522 within camera view region 520, as shown. In various embodiments, system 100 may be configured to selection a portion of such image data such that the perspective and/or lateral extent of camera view 522 is roughly aligned with the perspective of virtual model view 532 of virtual model region 530. The imaging module providing such image data may be implemented similar to imaging modules 223 and/or 224 of FIG. 2, for example, and may include any device or assembly configured to generate an image, or an image signal, based on received energy. For example, the imaging module or device (e.g., an embodiment of imager cluster 161 and/or system 220) may detect spatially distributed imaging energy (e.g., visible light and/or infrared radiation, among others) and convert the detected energy into a representative signal or image, whether in analog or digital format. In one or more embodiments, the imaging device may include a digital camera that generates a digital image signal to generate an image that visually portrays received radiation, the image displayed in camera view region 520. The imaging device may include various optics (i.e., one or more optical elements), such as (1) reflective elements (such as mirrors), (2) refractive elements (such as lenses), (3) transmissive or conductive elements (such as fiber optics or light guides), (4) diffractive elements (such as gratings), and/or (5) subtractive elements (such as filters), among others. Such imaging systems are non-limiting, and the imaging device may be any type of device or assembly configured to generate an image or image signal based on received energy.

Virtual model region 530 may include a synthetically generated 2D or 3D virtual model view 532 including representations of navigational hazards 510 (e.g., navigation threat indicators 510) and/or other features of navigational data within the corresponding virtual model that are positioned and/or oriented within virtual model view 532 relative to mobile structure 101. For instance, virtual model view 532 may include one or more graphical indicators corresponding to navigational hazards detected by navigation system 100 overlaid on a navigational chart, radar chart, or 2D or 3D rendered version of a virtual model corresponding to virtual model view 532. Depending on the application, virtual model view 532 may be a three-dimensional perspective view (e.g., FIG. 5), a two-dimensional plan view (e.g., FIG. 6), or a radar chart view (e.g., FIG. 7) of the area surrounding mobile structure 101. In such embodiments, a user may select between the various views as desired, such as switching between the three-dimensional, two-dimensional, or radar views, for example, or between different perspective views, as described herein.

In various embodiments, virtual model view 532 may be a rendering of a virtual model of the navigational situation around mobile structure 101, according to a selected perspective. For instance, as shown in FIG. 5, virtual model view 532 is rendered according to a 3D perspective view from a viewpoint disposed above and aft of mobile structure 101. In other embodiments, such 3D perspective view may be from a viewpoint disposed at or within mobile structure 101. System 100 may be configured to adjust such perspective via user input, such as user input panning the view to rotate to a different heading, for example, or to increase or decrease the elevation of such perspective.

In general, virtual model view 532 may include one or more graphics icons representing particular navigational hazards and/or characteristics of such navigational hazards overlaid on a topographical, bathymetrical, and/or other geographical or geospatial representation of the area surrounding mobile structure 101. In such embodiments, navigational sensors of navigation system 100 may detect characteristics of the navigational hazards and/or positions/orientations of such navigational hazards relative to mobile structure 101. For example, the one or more sensors may detect navigational hazard's position, course over ground (COG), speed over ground (SOG), or the like, which may be displayed as a text overlay adjacent each graphical icon within virtual model view 532, as shown in FIG. 5.

In particular, virtual model view 532 may include guard zone indicators 512 configured to indicate a desired or regulatory safety buffer perimeter about each navigational hazard 510 and/or mobile structure 101, where the safety buffer perimeter corresponds to a desired exclusion zone about the navigational hazard and/or mobile structure 101 while underway. Such guard zones may be highlighted (e.g., guard zone indicator 511) when a corresponding navigational hazard icon is selected in either of virtual model view 532 or camera view 522 (e.g., Lady Anne, as shown). In various embodiments, the size and/or radius of such guard zones may vary according to the SOG of the respective mobile structure/navigation hazard (to provide earlier alarms/warnings at faster speeds), a minimum depth approach (to provide earlier alarms/warnings at shallower depths), the number of mobile navigational hazards within a detectable range of navigation system 100 (to prioritize more immediate navigational hazards when there are many nearby).

Virtual model view 532 may also include heading indicators 513 configured to indicate a heading of each mobile navigational hazard 510 and/or mobile structure 101, for example, and/or waypoint indicators 514 indicating positions of known waypoints associated with planned routes for mobile navigational hazard 510 (e.g., communicated/transponded via AIS) and/or mobile structure 101. Each of such indicators may be rendered within both virtual model view 532 and camera view 522 such that they are roughly visually aligned with respect to an extent of navigation display view 500.

In various embodiments, system 100 may be configured to determine a navigational threat associated with each navigational hazard, with respect to mobile structure 101, based, at least in part, on the detected characteristics of each navigational hazard and/or a planned route or selected course for mobile structure 101. For example, system 100 may identify one or more navigational hazards 510 that intersect or approach a planned route or selected course of mobile structure 101 using navigational data received from one or more navigational sensors, as described herein. System 100 may then determine relative positions and/or extents of navigational exclusion zones corresponding to the identified navigational hazards, for example, and generate a corresponding navigational exclusion zone indicator within virtual model view 532, such as navigational exclusion zone indicator 541 associated with Lady Anne navigational hazard 510. In particular, navigational exclusion zone indicator 541 may be configured to identify the position and/or or extent of the navigational exclusion zone mobile structure 101 must not enter in order not to risk collision with Lady Anne navigational hazard 510. In some embodiments, such navigation exclusion zone may be determined assuming that the heading and speed of both Lady Anne navigational hazard 510 and mobile structure will be constant.

In some embodiments, navigation display view 500 may include heading indicator 534, which may be implemented as a horizontal meter configured to indicate the heading corresponding to the selected perspective of virtual model view 532 and/or camera view 522, for example, and/or a heading of mobile structure 101. In related embodiments, heading indicator 534 may include a heading exclusion indicator 540 corresponding to those headings for mobile structure 101 that maneuvers mobile structure 101 into the navigational exclusion zone corresponding to navigational exclusion zone indicator 541. Heading exclusion indicator 540 may include a port extent indicator 542 and/or a starboard extent indicator 544, for example, and heading indicator 534 and/or heading exclusion indicator 540 may include course marker 546 configured to aid a pilot in selecting a heading that evades the navigational exclusion zone corresponding to navigational exclusion zone indicator 541, and thereby eliminates the projected risk of collision with Lady Anne navigational hazard 510, as shown.

As noted herein, in various embodiments, system 100 may be configured to generate navigation display view 500 including virtual model view 532 and a threat timeline selector 590 (e.g., rendered as a graphical overlay over virtual model view 532) configured to allow a pilot to select a prospective threat evolution duration and/or scan from the present time and corresponding navigational status up through a maximum prospective time duration. In the embodiment shown in FIG. 5, threat timeline selector 590 includes threat timeline meter/event indicator 591 and display time indicator 594. Threat timeline meter/event indicator 591 may be configured to indicate a range of selectable threat timeline events (e.g., critical event 592 and waypoint arrival event 593) and prospective threat evolution durations (e.g., up to approximately 20 minutes in the state of threat timeline selector 590 shown in FIG. 5). In some embodiments, system 100 may be configured to receive user selection of either a threat timeline event or a particular prospective threat evolution duration and render a prospective version of virtual model view 532 according to the selected threat timeline event or a particular prospective threat evolution duration.

In various embodiments, system 100 may be configured to determine such prospective virtual model view based, at least in part, on the corresponding present navigational data and/or by assuming all navigational hazards represented within virtual model view 532 and/or within the corresponding virtual model continue along a constant course and/or speed (e.g., including zero speed over ground). In some embodiments, such prospective virtual model view may also be based on prevailing winds, currents, and/or other environmental conditions, for example, and/or on planned routes for mobile navigational hazards (e.g., communicated via AIS). System 100 may be configured to determine such threat evolution on an ongoing basis via updated navigational data, as described herein. For instance, system 100 may determine and render prospective threat events along threat timeline meter/event indicator 591 at the predicted times at which mobile structure 101 will encounter the one or more navigational hazards. System 100 may predict navigational hazards or otherwise dangerous areas using best assumptions of the future positions of mobile structure 101 and navigational hazards 510 based on the current behaviors (e.g., COG, SOG, etc.) of mobile structure 101 and/or navigational hazards 510. In this manner, system 100 may model future scenarios based on current conditions.

In some embodiments, a pilot may slide or scrub threat timeline selector 590 to visualize the points in time at which mobile structure 101 will encounter one or more navigational hazards, such as an accelerated animation of motion of objects identified in virtual model view 532. In such embodiments, sliding movement of threat timeline selector 590 may update virtual model view 532. For instance, virtual model view 532 and/or the position of the navigational hazards overlaid on virtual model view 532 may change dynamically as a pilot slides threat timeline selector 590 to select increasing or decreasing prospective threat evolution durations.

In some embodiments, virtual model region 530 may be interactive with camera view region 520. For instance, navigational hazards overlaid on the virtual model view 532 may be correlated to objects displayed in camera view region 520. In such embodiments, the one or more navigational hazards may be highlighted in virtual model region 530 and correlated in camera view region 520. In some embodiments, highlighting a navigational hazard in one region may highlight the same navigational hazard in the other region. In some embodiments, user selection of one or more navigational hazards within one region may control and/or adjust the information rendered in camera view region 520, or vice versa. For example, user selection of one or more navigational hazards within virtual model region 530 may rotate, pan, zoom, re-center, or otherwise alter camera view region 520 to show the selected navigational hazards within camera view region 520. Additionally, or alternatively, user selection of one or more navigational hazards within camera view region 520 may rotate, pan, zoom, re-center, or otherwise alter virtual model region 530 to show the selected navigational hazards within virtual model view 532. In this manner, the navigational hazards may be shown and highlighted in both camera view region 520 and virtual model region 530 of navigation display view 500. In one or more embodiments, camera view region 520 and virtual model region 530 may be rotated, panned, or zoomed in unison. For instance, swiping camera view region 520 to the left or right may rotate virtual model region 530 a corresponding amount such that camera view region 520 and virtual model region 530 face the same direction.

Depending on the application, the different navigational hazards 510 may be displayed within camera view region 520 and/or virtual model region 530 with different characteristics. For instance, a first set of navigational hazards may be presented within camera view region 520 and/or virtual model region 530 with a first characteristic (e.g., first color, first color palette, first symbol, etc.). A second set of navigational hazards may be presented within camera view region 520 and/or virtual model region 530 with a second characteristic (e.g., second color, second color palette, second symbol, etc.), with the second characteristic being different than the first characteristic. Additional sets of navigational hazards may be presented within camera view region 520 and/or virtual model region 530 with respective characteristics further differing from the first and second characteristics.

The different characteristics may allow a pilot to quickly and efficiently differentiate between various types of navigational hazards. For example, the different characteristics may allow the pilot to differentiate between static navigational hazards (e.g., buoys, lighthouses, landmasses, shallows, etc.) and mobile navigational hazards (e.g., other vehicles, vessels, aircraft, or watercraft, etc.). In addition, or alternatively, the different characteristics may facilitate a user differentiating between imminent and remote threats relatively quickly. For instance, imminent threats may be highlighted with a characteristic (e.g., color, saturation, animation) different than remote threats, such as with a characteristic that will immediately call the attention of the user. In this manner, the user may be able to identify and monitor the navigational danger(s) that is the most immediate threat to mobile structure 101, whether presently or in a future predicted condition.

Control region 524 may include one or more selectors for receiving user input provided by a user. For instance, control region 524 may include a plurality of buttons 550, each of which is implemented as a type of selector. Selection of each button 550 within control region 524 may open a respective dialog or window within navigation display view 500 and/or rendered by user interface. For example, user selection of a virtual model view button 552 may open a new window, panel, or view allowing a pilot to switch between alternative display modes for virtual model region 530, such as switching between a three-dimensional view, a two-dimensional view, or a radar view. Alternatively, user selection of virtual model view button 552 may toggle between the various display modes for virtual model region 530. User selection of a home button 554 may cause the navigation display view 500 to display a home or default selection of regions or a navigation display view settings menu. Such examples are illustrative only, and the control region 524 may include other buttons or commands.

Each window, panel, or region as displayed within navigation display view 500 may be customizable by the user, e.g., via different view configuration options. The configuration options may include, but are not limited to, window control options for resizing and repositioning each window within the navigation display view 500 as desired. For instance, each window may be maximized, minimized, closed, opened, added, or deleted within the navigation display view 500 as desired. In one or more embodiments, the windows may function as individual GUI widgets within navigation display view 500. Accordingly, navigation system may include a software library (toolkit) containing a collection of GUI widgets that may be selectively added to or removed from the navigation display view 500 as desired by the user. However, it should be appreciated that embodiments are not limited thereto and that the individual windows may be implemented as separate floating windows within a main application window or as separate panels within a single window.

Figure 6:
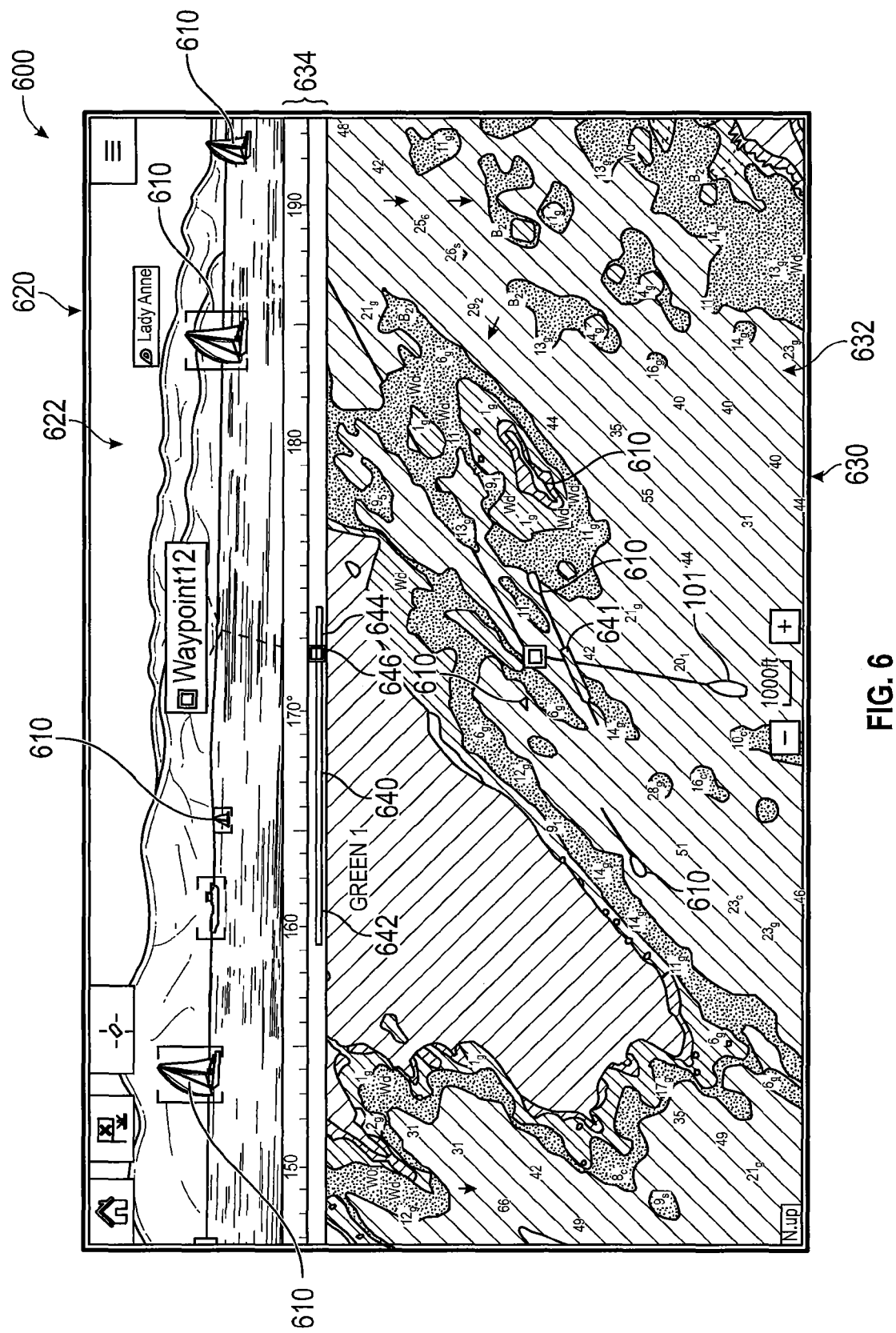
FIG. 6 illustrates a diagram of a navigation display view that may be rendered within a display of a user interface for a navigation system in accordance with an embodiment of the disclosure.

FIG. 6 illustrates a diagram of a navigation display view 600 that may be rendered within a display (e.g., display 226, displays 426) of user interface 120 for navigation system 100 in accordance with an embodiment of the disclosure. Navigation display view 600 of FIG. 6 may be similar to navigation display view 500 of FIG. 5, described above, and thus includes similarly numbered elements, and may include embodiments of threat timeline selector 590 rendered within navigation display view 600 and/or virtual model region 630. As shown in FIG. 6, virtual model view 632 may be a two-dimensional view of the area surrounding mobile structure 101, which may be beneficial or preferred for displaying conventional topographical or bathymetrical images or data. Depending on the application, the two-dimensional virtual model view 632 may be oriented or aligned with true north or the current heading of mobile structure 101.

Figure 7:
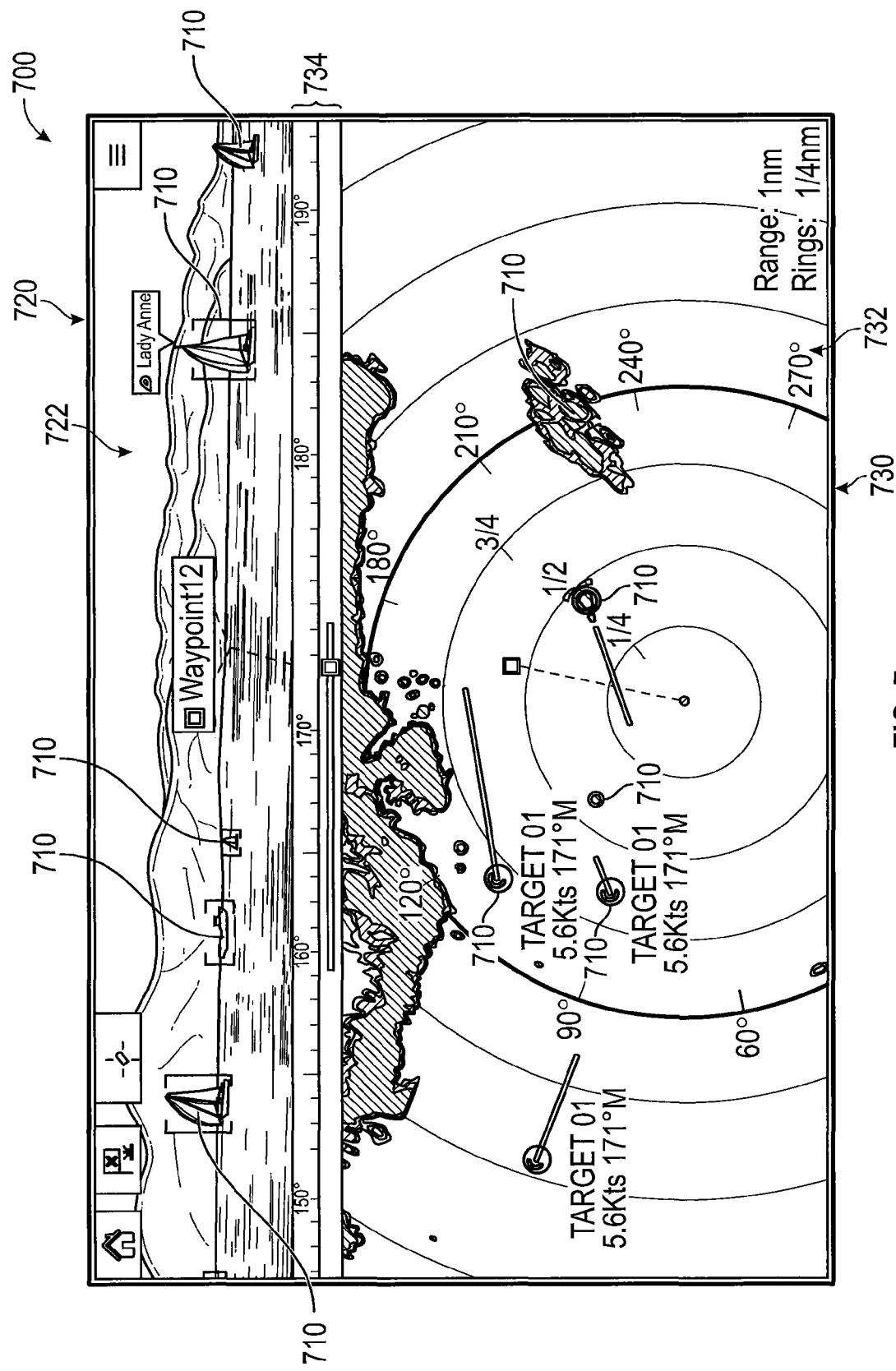
FIG. 7 illustrates a diagram of a navigation display view that may be rendered within a display of a user interface for a navigation system in accordance with an embodiment of the disclosure.

FIG. 7 illustrates a diagram of a navigation display view 700 that may be rendered within a display (e.g., display 226, displays 426) of user interface 120 for navigation system 100 in accordance with an embodiment of the disclosure. Navigation display view 700 of FIG. 7 may be similar to the navigation display views 500 and 600 of FIGS. 5 and 6, described above, and thus includes similarly numbered elements, and may include embodiments of threat timeline selector 590 rendered within navigation display view 700 and/or virtual model region 730. As shown in FIG. 7, virtual model view 732 may be a radar chart view of the area surrounding mobile structure 101, which may be preferred by the user or beneficial depending on the application, such as for displaying a radial distance grid for quickly determining or estimating distances between mobile structure 101 and the one or more navigational hazards 710. Like two-dimensional virtual model view 632 of FIG. 6, radar virtual model view 732 may be oriented or aligned with true north or the current heading of mobile structure 101.

Figure 8:
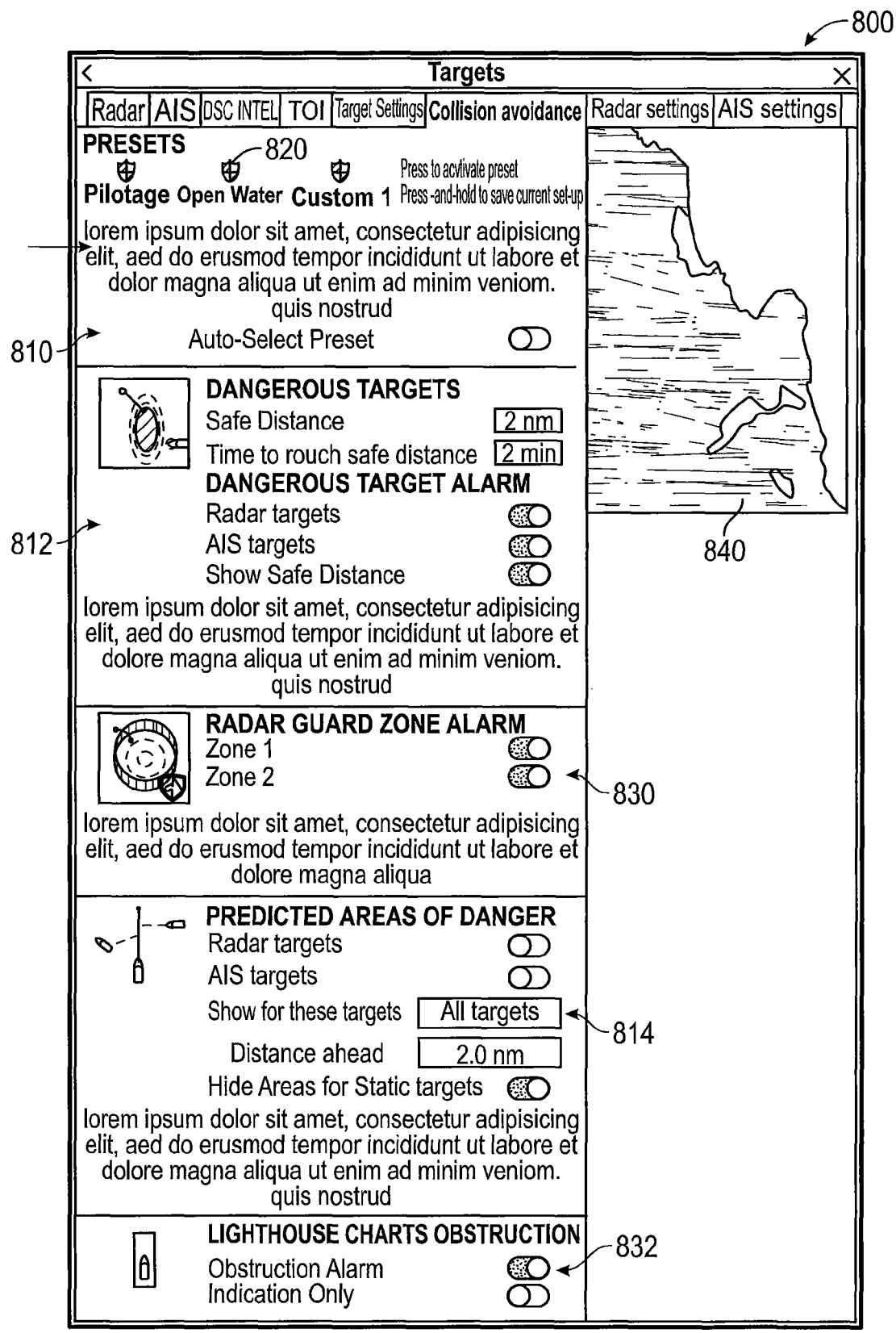
FIG. 8 illustrates a diagram of a safety alarm display view that may be rendered within a display of a user interface for a navigation system in accordance with an embodiment of the disclosure.

FIG. 8 illustrates a diagram of a safety alarm display view 800 that may be rendered within a display (e.g., display 226, displays 426) of user interface 120 in accordance with an embodiment of the disclosure. The safety alarm display view 800 may be rendered in response to a user's selection of a triggering button or command within control region 524. Depending on the application, the safety alarm display view 800 may be another panel or region within the navigation display view 500, 600, or 700, or may be a separate dialog window displayed in response to user selection of a safety alarm button. The safety alarm display view 800 may overlay at least a portion of the navigation display view 500, 600, or 700, or may be a separate display view.

Safety alarm display view 800 may allow a user to view and/or modify one or more of a plurality of safety alarms based on or associated with the one or more navigational hazards. In one or more embodiments, the safety alarm display view 800 may include one or more dialog windows, panels, or regions presenting various information and controls over the safety alarms. For example, and without limitation, safety alarm display view 800 may include a preset selection region 810, a dangerous target region 812, and a predicted areas of danger region 814, each described below.

The preset selection region 810 may present a plurality of preset alarm configurations for user selection. For example, the plurality of safety alarms may be grouped into a plurality of alarm presets. Each alarm preset may include a different alarm subset of the plurality of safety alarms, each alarm subset corresponding to a different scenario of mobile structure 101. For instance, different subsets of safety alarms may be desired depending on the position and/or movement of mobile structure 101. For example, the safety alarms may be grouped into the following presets or subsets corresponding to respective scenarios of mobile structure 101: close quarters maneuvering, pilotage in restricted waterways, open water navigation, and oceanic navigation, though other presets/subsets are contemplated depending on mobile structure 101. In such embodiments, user selection of a particular preset option within preset selection region 810 may activate or deactivate a group of safety alarms at the same time. For instance, user selection of an open water button 820 within preset selection region 810 may activate or deactivate all alarms associated with open water navigation at the same time with a single click. In some embodiments, the preset selection region 810 may include alarm presets that are customized by a user, the user determining which alarm or set of alarms to be associated with the custom preset.

The dangerous target region 812 may present one or more alarm configurations modifiable by the user. For instance, the dangerous target region 812 may include one or more input fields, toggles, or switches allowing a user to modify at least one alarm configuration for dangerous targets or navigational hazards. Modifiable alarm configurations include, but are not limited to, presets related to a minimum safe distance and the time required to reach a safe distance away from dangerous targets or navigational hazards. The dangerous target region 812 may also allow a user to toggle the following functions on or off: radar target tracking, automatic identification system (AIS) tracking, and safe distance display, among others.

The predicted areas of danger region 814 may present one or more modifiable alarm configurations related to displaying areas of danger within navigation display view 500, 600, or 700. For example, the predicted areas of danger region 814 may allow a user to select whether to show areas of danger related to targets acquired through AIS or radar. The predicted areas of danger region 814 may also allow a user to select whether to hide areas of danger for static targets from the virtual model view 532.

The safety alarm display view 800 may include other regions presenting various information and controls over the safety alarms. Other example regions include, but are not limited to, a radar guard zone alarm region 830 and a lighthouse charts obstruction region 832. The radar guard zone alarm region 830 may allow a user to select at which of several radar zones, if any, an alarm will go off. The lighthouse charts obstruction region 832 may allow a user to select whether an alarm or an indication will present if mobile structure 101 enters an area obstructed from view by a lighthouse.

The safety alarm display view 800 may include other features for convenience. For instance, the safety alarm display view 800 may include a chart or map view 840.

Similar to virtual model region 530 of FIG. 5, described above, the map view 840 may display one or more navigational hazards overlaid on a map image. The map view 840 may provide an updated visualization of virtual model region 530 to a user as alarm presets and options are selected or changed within the various regions of safety alarm display view 800. Depending on the options and presets selected, the map view 840 may be streamlined (e.g., decluttered) compared to traditional configurations. For instance, rather than displaying each depth and depth contour of the area surrounding mobile structure 101, the map view 840 may simplify the displayed depths into safe and unsafe conditions only.

Figure 9:
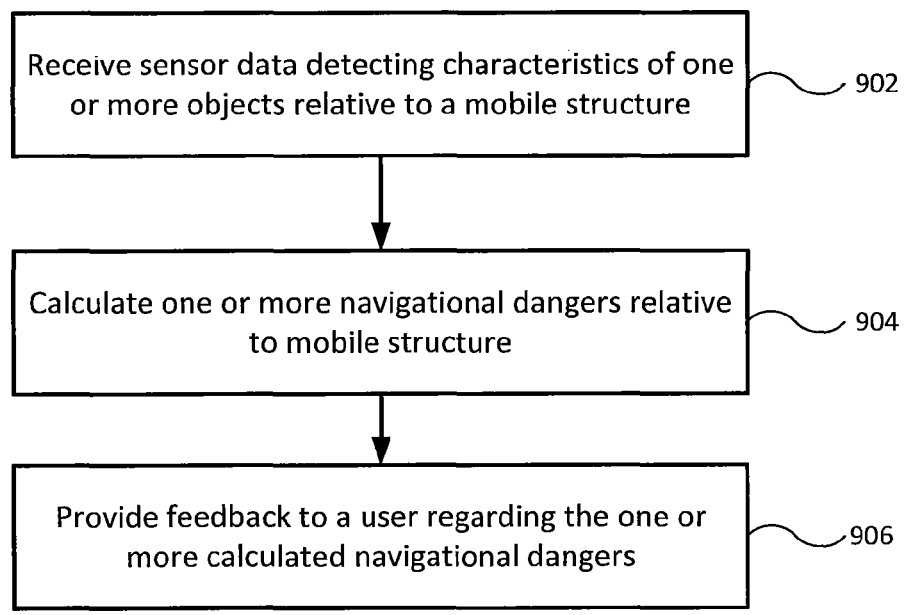
FIG. 9 illustrates a flowchart of a process for providing feedback to a user regarding one or more navigational hazards in accordance with an embodiment of the disclosure.

FIG. 9 illustrates a flowchart of a process 900 for calculating and providing feedback to a pilot regarding one or more navigational hazards based on received navigational data in accordance with an embodiment of the disclosure. Any step, sub-step, sub-process, or block of process may be performed in an order or arrangement different from the embodiments illustrated by FIG. 9. For example, one or more blocks may be omitted from or added to the process 900. Further, block inputs, block outputs, sensor signals and information, calibration parameters, and/or other operational parameters may be stored to one or more memories prior to moving to a following portion of a corresponding process. Although process 900 is described with reference to systems and display views described in reference to FIGS. 1A-8, process 900 may be performed by other systems and display views different from those systems and display views and including a different selection of electronic devices, sensors, assemblies, mobile structures, mobile structure attributes, and/or display view elements, as described herein.

In block 902, navigational data is received. For example, controller 130 may be configured to receive navigational data from one or more of sonar system 110, orientation sensor 140, speed sensor 142, gyroscope/accelerometer 144, GNSS 146, and/or other navigation sensors (e.g., other modules 180, elements of system 220 of FIG. 2, elements of system 420 of FIG. 4). In some embodiments, system 100 may be configured to receive absolute position data from GNSS 146, for example, and image data from imaging module 223 and/or 224. More generally, system 100 may be configured to receive navigational data from at least one navigation sensor configured to detect characteristics of one or more navigational hazards in the vicinity of mobile structure 101. For example, imaging, radar, sonar, and positional data, among others, may be obtained from one or more navigation sensors coupled to, associated with, and/or in proximity to mobile structure 101 and configured to detect the position, heading, and speed of one or more vehicles (e.g., ground vehicle, watercraft, aircraft, etc.) and static objects in a navigational area surrounding mobile structure 101.

In block 904, a virtual model (e.g., an integrated model) may be determined. For example, controller 130 may be configured to determine a virtual model (e.g., a model of the physical state of mobile structure 101 and/or its surroundings, as measured by one or more navigation sensors) including at least one navigational hazard based, at least in part, on the navigational data received in block 902. In embodiments where the navigational data includes absolute position data provided by GNSS 146 and/or chart data retrieved from a memory of system 100, the virtual model may include the combination of such data such that the virtual model may be rendered as a 2D chart or a 3D perspective via a display of user interface 120 with a mark or icon indicating an absolute position, orientation, and/or velocity of mobile structure 101 referenced to and/or overlaying the chart data, as described herein. In related embodiments, the virtual model may include navigational data contributions from a variety of different navigation sensors such that the virtual model may be rendered as a 2D chart, a 3D perspective, a radar chart, and/or other virtual model view via a display of user interface 120.

More generally, system 100 may be configured to determine (e.g., detect and/or identify) one or more navigational hazards relative to mobile structure 101 using the navigational data received in block 902. For instance, based on current positions, headings, and speeds of mobile navigational hazards and/or static navigational hazards surrounding mobile structure 101, future dangers, such as potential collisions, beaching, capsizing, or the like, may be determined or predicted based, at least in part, on the received navigational data.

In block 906, a navigation display view is generated. For example, controller 130 and/or user interface 120 may be configured to generate navigation display view 500 including virtual model view 532 rendered within virtual model region 530 based, at least in part, on the virtual module determined in block 904. In general, virtual model view 532 may be implemented as a three-dimensional perspective view, a two-dimensional plan or chart view, or a radar chart view, as described herein. In some embodiments, virtual model view 532 may include a navigation threat indicator corresponding to the navigational hazard identified within the virtual module determined in block 904. In embodiments where the navigation sensors include an imaging module configured to provide image data of a navigable area about mobile structure 101, the generating the navigation display view may include generating a camera view disposed above and substantially spatially aligned with the virtual model view based, at least in part, on the image data provided by the imaging module, as described herein. In related embodiments, system 100 may be configured to identify a portion of the camera view corresponding to a navigational hazard identified within the virtual module (e.g., based, at least in part, on the virtual model determined in block 904), receive user selection of the navigation threat indicator within the virtual model view (e.g., via user interface 120), and highlight the navigation threat indicator within the virtual model view and the portion of the camera view corresponding to the at least one navigational hazard, as described herein.

In some embodiments, system 100 may be configured to determine a navigation exclusion zone 541 corresponding to a navigational hazard identified within a virtual model based, at least in part, on the determined virtual model (e.g., the navigational data within the virtual model), for example, and to generate a virtual model view including a navigation exclusion zone indicator corresponding to the determined navigation exclusion zone. In related embodiments, the navigation display view may include a heading indicator 534 implemented as a horizontal meter configured to indicate a heading corresponding to a perspective of the generated virtual model view and/or a heading of mobile structure 101. Heading indicator 534 may include a heading exclusion indicator 540 corresponding to headings for mobile structure 101 that maneuvers mobile structure 101 into the determined navigation exclusion zone 541.

In various embodiments, system 100 may be configured to determine a prospective virtual model based, at least in part, on the virtual model determined in block 904, for example, and to generate an updated navigation display view comprising a prospective virtual model view based, at least in part, on the determined prospective virtual model. In related embodiments, system 100 may be configured to render a threat timeline selector within the navigation display view (e.g., via a display of a user interface), receive a selected prospective threat evolution duration (e.g., from the user interface), and determine the prospective virtual model based, at least in part, on the virtual model determined in block 904 and the selected prospective threat evolution duration.

More generally, system 100 may be configured to provide feedback to a pilot regarding one or more determined navigational hazards. In some embodiments, the one or more navigational hazards may be rendered on a display of a user interface (e.g., display 226 and/or displays 426). Rendering the one or more navigational hazards on the display may include indicating the point (e.g., time, position, etc.) at which mobile structure 101 will encounter the one or more navigational hazards. In various embodiments, the one or more navigational hazards may be rendered in both a camera view region 520 and a virtual model region 530 of the display.

In some embodiments, a plurality of safety alarms may be generated based on the one or more navigational hazards. The plurality of safety alarms may be grouped into a plurality of alarm presets. Each alarm preset may include a different alarm subset of the plurality of safety alarms. Each alarm subset may correspond to a different scenario of mobile structure 101. At least one alarm preset may be activated or deactivated to activate or deactivate a group of safety alarms at the same time. For example, at least one alarm preset may be activated or deactivated based on user input. At least one alarm preset may be activated or deactivated based on the position of mobile structure 101. For instance, as mobile structure 101 enters open waters, the system may automatically activate and/or deactivate groups of safety alarms based on an alarm subset corresponding to open water navigation. Should mobile structure 101 then enter a different navigation scenario, such as pilotage in a restricted waterway, the system may deactivate the group of safety alarms associated with open water navigation and activate the group of safety alarms associated with pilotage in restricted waterways.

More generally, system 100 may be configured to determine that mobile structure 101 is approaching a navigational hazard based, at least in part, on the virtual model determined in block 904, and to generate a visual and/or audible proximity alarm based, at least in part, on a status of mobile structure 101 including one of a close quarter maneuvering status, a restricted waterway maneuvering status, an open water maneuvering status, and an oceanic navigation maneuvering status, as described herein. Such statuses may be determined based on a present-time virtual model view, for example, or may be determined according to a prospective virtual model view and/or a corresponding selected prospective threat evolution duration, as described herein, so as provide visible and/or audible alarms according to a predicted future scenario, including live or arrival depths associated with a waypoint or destination for mobile structure 101.

Where applicable, various embodiments provided by the present disclosure can be implemented using hardware, software, or combinations of hardware and software. Also, where applicable, the various hardware components and/or software components set forth herein can be combined into composite components comprising software, hardware, and/or both without departing from the spirit of the present disclosure. Where applicable, the various hardware components and/or software components set forth herein can be separated into sub-components comprising software, hardware, or both without departing from the spirit of the present disclosure. In addition, where applicable, it is contemplated that software components can be implemented as hardware components, and vice-versa.

Software in accordance with the present disclosure, such as non-transitory instructions, program code, and/or data, can be stored on one or more non-transitory machine-readable mediums. It is also contemplated that software identified herein can be implemented using one or more general purpose or specific purpose computers and/or computer systems, networked and/or otherwise. Where applicable, the ordering of various steps described herein can be changed, combined into composite steps, and/or separated into sub-steps to provide features described herein.

Embodiments described above illustrate but do not limit the invention. It should also be understood that numerous modifications and variations are possible in accordance with the principles of the invention. Accordingly, the scope of the invention is defined only by the following claims.

What is claimed is:

1. A system comprising:
   one or more navigation sensors coupled to and/or associated with a mobile structure and configured to provide navigational data associated with the mobile structure; and
   a logic device configured to execute instructions to communicate with the one or more navigation sensors and to:
      receive navigational data from the one or more navigation sensors;
      determine a virtual model comprising at least one navigational hazard based, at least in part, on the received navigational data;
      generate a navigation display view comprising a virtual model view based, at least in part, on the determined virtual model, wherein the virtual model view comprises at least one navigation threat indicator corresponding to the at least one navigational hazard;
      determine a prospective virtual model based, at least in part, on the determined virtual model; and
      generate an updated navigation display view comprising a prospective virtual model view based, at least in part, on the determined prospective virtual model.

2. The system of claim 1, further comprising a user interface coupled to and/or associated with the mobile structure, wherein the user interface comprises a display, and wherein the logic device is configured to execute instructions to:
   render a threat timeline selector within the navigation display view via the display of the user interface;
   receive a selected timeline event or prospective threat evolution duration from the user interface; and
   determine the prospective virtual model based, at least in part, on the determined virtual model and the selected timeline event or the prospective threat evolution duration.

3. The system of claim 1, wherein:
   the one or more navigation sensors comprises a position sensor configured to provide an absolute position of the mobile structure and an imaging module configured to provide image data of a navigable area about the mobile structure;
   the logic device is configured to execute instructions to determine the virtual model comprising the at least one navigational hazard based, at least in part, on one or more absolute positions of the mobile structure provided by the position sensor; and the generating the navigation display view comprises generating a camera view disposed above and aligned with the virtual model view based, at least in part, on the image data provided by the imaging module.

4. The system of claim 3, wherein:

the imaging module comprises a visible spectrum imaging module configured to provide visible spectrum image data of the navigable area about the mobile structure and/or an infrared imaging module configured to provide thermal image data of the navigable area about the mobile structure.

5. The system of claim 3, wherein the logic device is configured to execute instructions to:

identify a portion of the camera view corresponding to the at least one navigational hazard based, at least in part, on the determined virtual model;

receive user selection of the at least one navigation threat indicator within the virtual model view; and highlight the at least one navigation threat indicator within the virtual model view and the portion of the camera view corresponding to the at least one navigational hazard.

6. The system of claim 1, wherein:

the logic device is configured to execute instructions to determine a navigation exclusion zone corresponding to the at least one navigational hazard based, at least in part, on the determined virtual model; and the virtual model view comprises a navigation exclusion zone indicator corresponding to the determined navigation exclusion zone.

7. The system of claim 6, wherein:

the navigation display view comprises a heading indicator implemented as a horizontal meter configured to indicate a heading corresponding to a perspective of the generated virtual model view and/or a heading of the mobile structure; and the heading indicator comprises a heading exclusion indicator corresponding to headings for the mobile structure that maneuvers the mobile structure into the determined navigation exclusion zone.

8. The system of claim 1, wherein the one or more navigation sensors comprises a plurality of navigation sensors, and wherein the logic device is configured to execute instructions to:

determine that the mobile structure is approaching the at least one navigational hazard based, at least in part, on the determined virtual model; and generate a visual and/or audible proximity alarm based, at least in part, on a status of the mobile structure comprising one of a close quarter maneuvering status, a restricted waterway maneuvering status, an open water maneuvering status, and an oceanic navigation maneuvering status.

9. The system of claim 8, wherein:

the alarm corresponds to a subset of available alarms associated with an activated alarm preset; and the virtual model view comprises a three-dimensional perspective view, a two-dimensional plan or chart view, or a radar chart view.

10. The system of claim 1, further comprising a user interface coupled to and/or associated with the mobile structure, wherein the user interface comprises a display, and wherein the logic device is configured to execute instructions to:

render, along a threat timeline within the navigation display view via the display of the user interface, a plurality of prospective threat events and their associated predicted times at which the mobile structure will encounter the threat events; and dynamically update the prospective virtual model to animate motion of the threat events corresponding to points in time in response to a user manipulation of the threat timeline.

11. A method comprising:

receiving navigational data from one or more navigation sensors coupled and/or in proximity to a mobile structure and configured to provide navigational data associated with the mobile structure;

determining a virtual model comprising at least one navigational hazard based, at least in part, on the received navigational data;

generating a navigation display view comprising a virtual model view based, at least in part, on the determined virtual model, wherein the virtual model view comprises at least one navigation threat indicator corresponding to the at least one navigational hazard;

determining a prospective virtual model based, at least in part, on the determined virtual model; and generating an updated navigation display view comprising a prospective virtual model view based, at least in part, on the determined prospective virtual model.

12. The method of claim 11, further comprising:

rendering a threat timeline selector within the navigation display view via a display of a user interface coupled to and/or associated with the mobile structure;

receiving a selected timeline event or prospective threat evolution duration from the user interface; and determining the prospective virtual model based, at least in part, on the determined virtual model and the selected timeline event or prospective threat evolution duration.

13. The method of claim 11, wherein:

the one or more navigation sensors comprises a position sensor configured to provide an absolute position of the mobile structure and an imaging module configured to provide image data of a navigable area about the mobile structure;

the method comprises determining the virtual model comprising the at least one navigational hazard based, at least in part, on one or more absolute positions of the mobile structure provided by the position sensor; and the generating the navigation display view comprises generating a camera view disposed above and aligned with the virtual model view based, at least in part, on the image data provided by the imaging module.

14. The method of claim 13, wherein:

the imaging module comprises a visible spectrum imaging module configured to provide visible spectrum image data of the navigable area about the mobile structure and/or an infrared imaging module configured to provide thermal image data of the navigable area about the mobile structure.

15. The method of claim 13, further comprising:

identifying a portion of the camera view corresponding to the at least one navigational hazard based, at least in part, on the determined virtual model;

receiving user selection of the at least one navigation threat indicator within the virtual model view; and highlighting the at least one navigation threat indicator within the virtual model view and the portion of the camera view corresponding to the at least one navigational hazard.

16. The method of claim 11, further comprising determining a navigation exclusion zone corresponding to the at least one navigational hazard based, at least in part, on the determined virtual model, wherein:

the virtual model view comprises a navigation exclusion zone indicator corresponding to the determined navigation exclusion zone.

17. The method of claim 16, wherein:

the navigation display view comprises a heading indicator implemented as a horizontal meter configured to indicate a heading corresponding to a perspective of the generated virtual model view and/or a heading of the mobile structure; and the heading indicator comprises a heading exclusion indicator corresponding to headings for the mobile structure that maneuvers the mobile structure into the determined navigation exclusion zone.

18. The method of claim 11, wherein the one or more navigation sensors comprises a plurality of navigation sensors, the method further comprising:

determining that the mobile structure is approaching the at least one navigational hazard based, at least in part, on the determined virtual model; and generating a visual and/or audible proximity alarm based, at least in part, on a status of the mobile structure comprising one of a close quarter maneuvering status, a restricted waterway maneuvering status, an open water maneuvering status, and an oceanic navigation maneuvering status.

19. The method of claim 18, wherein:

the alarm corresponds to a subset of available alarms associated with an activated alarm preset; and the virtual model view comprises a three-dimensional perspective view, a two-dimensional plan or chart view, or a radar chart view.

20. The method of claim 11, further comprising:

rendering, along a threat timeline within the navigation display view via a display of a user interface coupled to and/or associated with the mobile structure, a plurality of prospective threat events and their associated predicted times at which the mobile structure will encounter the threat events; and dynamically updating the prospective virtual model to animate motion of the threat events corresponding to points in time in response to a user manipulation of the threat timeline.

* * * * *